United States Patent
Suzuki

(10) Patent No.: US 6,275,545 B1
(45) Date of Patent: Aug. 14, 2001

(54) MATCHED FILTER AND METHOD OF SYNCHRONIZING OPERATION TIMING OF RECEIVER WITH PHASE OF DESIRED WAVE SIGNAL

(75) Inventor: Hidetoshi Suzuki, Yokohama (JP)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 09/094,146

(22) Filed: Jun. 9, 1998

(30) Foreign Application Priority Data

Jun. 16, 1997 (JP) ................................................ 9-158912

(51) Int. Cl.$^7$ .................................................. H03D 1/00
(52) U.S. Cl. .................... 375/343; 375/152; 375/142; 375/143
(58) Field of Search .................... 375/343, 350, 375/136, 142, 143, 147, 150, 152

(56) References Cited

U.S. PATENT DOCUMENTS

| | | | |
|---|---|---|---|
| 4,025,772 | 5/1977 | Constant | 235/156 |
| 4,507,746 | 3/1985 | Fletcher, Jr. | 364/717 |
| 5,293,398 | 3/1994 | Hamao et al. | 375/1 |
| 5,563,955 | * 10/1996 | Bass et al. | 382/101 |
| 5,627,855 | * 5/1997 | Davidovici | 375/207 |

* cited by examiner

*Primary Examiner*—Stephen Chin
*Assistant Examiner*—Mohammad Ghayour
(74) *Attorney, Agent, or Firm*—Ratner & Prestia

(57) ABSTRACT

Herein disclosed is a matched filter for synchronizing a phase of an input wave signal with that of a desired wave signal, thereby making it possible to decrease the power consumption. The matched filter comprises a plurality of correlation units each having a multiplier and an integrator. The multiplier of each correlation units is designed to multiply an input signal by a predetermined coefficient at predetermined intervals in a predetermined operation cycle of the matched filter. The coefficient sequentially varies at the intervals. The integrator of each correlation units is designed to integrate the product obtained by the multiplier over the operation cycle into a correlation value. The matched filter further comprises control and multiplexer. The control means is designed to output a plurality of control signals at the intervals to direct the correlation units, respectively, to start operating. The multiplexer is electrically connected to the correlation units for inputting the correlation values and sequentially outputting one of the correlation values in response to the control signal and resetting the one correlation value.

35 Claims, 11 Drawing Sheets

MATCHED FILTER AND METHOD OF SYNCHRONIZING OPERATION TIMING OF RECEIVER WITH PHASE OF DESIRED WAVE SIGNAL

BACKGROUND OF THE INVENTION

1. Field of the Invention

The present invention relates to a matched filter and a method of synchronizing the operation timing of a receiver with a phase of a wave signal transmitted from a sender in a code division multiple access (referred to simply as "CDMA") system adaptable for a spread spectrum communication (abbreviated to "SSC") system.

2. Description of the Related Art

There have so far been proposed a wide variety of matched filters for synchronizing the operation timing of the receiver with the phase of the wave signal transmitted from the sender in the CDMA system. In the sender, the signal is spread over large bandwidth by moderating the signal with a carrier signal and mixing the modulated signal with a pseudo-noise (PN) sequence. The PN sequence is represented by binary codes each having a chip duration Tc and each appearing at a chip rate Rc equal to 1/Tc Hz. The PN sequence codes partially form a group repeatedly appearing at every sequence period T. The ratio of the sequence period T to the chip duration Tc is called a "spreading ratio" or a "processing gain". The spread signal is then transmitted from the sender to the receiver.

The conventional matched filter comprises a correlator including a charge coupled device (CCD) and a surface acoustic wave (SAW) element used for calculating a correlation value between the received wave signal and a predetermined reference code sequence to obtain a desired wave signal. The CCD or SAW can be regarded as a delay line utilized for an analog signal.

The conventional matched filter of this type for calculating the correlation is disclosed by Japanese Non-examined Patent Publication No. 5-136779. The conventional matched filter thus disclosed comprises first, second, third and fourth hold units 11, 21, 31 and 41, first, second, third and fourth multipliers 13, 23, 33 and 43 and an adder 50 as shown in FIG. 11. The reference code sequence is represented by a series of four codes each having a chip duration Tc. In this case, the sequence period T is four times as longer as the chip duration Tc. Therefore, the spreading ratio of the matched filter is four chips.

Each of the first, second, third and fourth hold units 11, 21, 31 and 41 has an input terminal and an output terminal and is designed to hold an input signal inputted through the input terminal for a predetermined delay duration and to output the signal through the output terminal after the delay duration. The delay duration is equal to or less than a quarter of one chip duration Tc/4 in the conventional matched filter. The second, third and fourth hold units 21, 31 and 41 are electrically connected to the first, second and third hold units 11, 21 and 31 through the input terminals of the second, third and fourth hold units 21, 31 and 41, respectively. Accordingly, the first, second, third and fourth hold units 11, 21, 31 and 41 are integrally formed into a shift register used for successively holding the input signal and serve as the delay lines. The first, second, third and fourth hold units 11, 21, 31 and 41 may be constructed from flip-flop circuits.

Each of the first, second, third and fourth multipliers 13, 23, 33 and 43 has first and second input terminals and an output terminal and is designed to multiply data inputted through the second input terminal by a coefficient inputted through the first input terminal to output the product through the output terminal. The coefficients inputted to the first, second, third and fourth multipliers 13, 23, 33 and 43 are represented by the reference characters "A1", "A2", "A3" and "A4", respectively, in FIG. 11. The coefficients A1, A2, A3 and A4 are invariable and each indicates data at each distortion of the phase of the desired signal corresponding to each chip duration Tc in the sequence period T.

In the CDMA system, the reference code sequence comprises predetermined codes serially aligned, each having one chip duration Tc and being constructed from +1 or −1. Therefore, the multipliers in this kind of matched filter may be supplied with the coefficient +1 or −1.

The adder 50 has first, second, third and fourth input terminals and an output terminal. The adder 50 is designed to add inputs through the first, second, third and fourth input terminals to output the sum through the output terminal. The adder 50 is electrically connected to the first, second, third and fourth multipliers 13, 23, 33 and 43 through the first, second, third and fourth input terminals, respectively. The inputs through the first, second, third and fourth input terminals of the adder 50 are sequentially added to the preserved data in the adder 50. This means that the adder 50 should carry out adding operations four times in one chip duration Tc in order to output a correlation value represented by the reference character "Y(t)" in FIG. 11 at the chip rate Rc.

The manner of over-sampling the input signal at a chip rate Rc of two sampling times to one chip duration Tc by the use of the conventional matched filter will now be explained. This kind of matched filter comprises another pair of fifth, sixth, seventh and eighth hold units (not shown) in addition to the first, second, third and fourth hold units 11, 21, 31 and 41 as shown in FIG. 11. The fifth hold unit has an input terminal through which the input signal X(t) is inputted, and is designed to be held for a half of the described above delay duration. The fifth hold unit also has an output terminal through which the input signal X(t) appears after the half delay duration. The sixth, seventh and eighth hold units are similar to the fifth hold unit.

The matched filter thus constructed can over-sample the input signal X(t), i.e., the number of sampled signal, obtained by these hold units are two times as large as those obtained in the matched filter shown in FIG. 11. In the case where the matched filter is adapted to over-sampling the input signal at the chip rate Rc of four sampling times to one chip duration Tc, the matched filter is required to prepare the hold units four times as much as those of the matched filter shown in FIG. 11.

However, a drawback encountered in the conventional matched filter of the above-described nature is that all of the constructed circuits in the conventional matched filter simultaneously operate, thereby consuming a large amount of power. Furthermore, a long distance is needed for electrically wiring between the multipliers and the adder, which means that a large area on a chip element of the conventional matched filter is used by the wires. Moreover, the adder of the conventional matched filter should sum up all of the products obtained by the multipliers in one chip duration Tc, which means that the adder must operate promptly. This means that the conventional matched filter also tends to consume a large amount of power. The conventional matched filter must therefore simultaneously operate together with all of the constructed circuits, since it is impossible to carry out the operation by only using part of the constructed circuits.

A drawback encountered in another conventional matched filter adaptable to over-sampling is that the conventional matched filter lacks flexibility in its design because of the fact that the matched filter needs a plurality of additional hold units corresponding to a ratio of over-sampling times to one chip duration Tc. Moreover, the additional hold units are available for only over-sampling, but not available for the matched filter which stops over-sampling. This results in that the matched filter can decrease its utilization factor.

SUMMARY OF THE INVETION

It is an object of the present invention to provide a matched filter for synchronizing a phase of an input wave signal with that of a desired wave signal, thereby making it possible to decrease the power consumption.

It is another object of the present invention to provide a matched filter for synchronizing a phase of an input wave signal with that of a desired wave signal which is adaptable for over-sampling with no need for the additional elements.

It is a further object of the present invention to provide a method of synchronizing a phase of an input wave signal with that of a desired wave signal, thereby making it possible to decrease the power consumption.

It is also an object of the present invention to provide a method of synchronizing a phase of an input wave signal with that of a desired wave signal which is easily adaptable for over-sampling.

In accordance with a first aspect of the present invention, there is provided a matched filter for synchronizing a phase of an input wave signal with that of a desired wave signal. The matched filter comprises a plurality of correlation units each having a multiplier for multiplying an input signal by a predetermined coefficient at predetermined intervals in a predetermined operation cycle of the matched filter. The coefficient sequentially varies at the intervals. The matched filter further comprises an integrator for integrating the product obtained by the multiplier over the operation cycle into a correlation value and control means for outputting a plurality of control signals at the intervals to direct the correlation units, respectively, to start operating. The matched filter comprises a multiplexer electrically connected to the correlation units for inputting the correlation values and sequentially outputting one of the correlation values in response to the control signal and resetting the one correlation value.

In the matched filter, the integrator of each of the correlation units may comprise: an adder having first and second input terminals and an output terminal for adding data inputted through the first input terminal and data inputted through the second input terminal to output the sum through the output terminal at the intervals; and hold means having an input terminal electrically connected to the output terminal of the adder and an output terminal electrically connected to the second input terminal of the adder and the multiplexer for inputting the sum from the adder and outputting the sum to the adder at the intervals, and holding the sum as a preserved data until the preserved data is outputted to the multiplexer and reset in response to the control signal.

In the matched filter, the number of intervals may represent a spreading ratio in the input signal. In the matched filter, the coefficient may be varied in response to a predetermined code sequence for the input signal at the intervals.

Alternatively, the matched filter may comprise signal supply means electrically connected to the correlation units for selectively supplying the input signal for at least one of the correlation units. In addition, the matched filter may comprise enable means for selectively enabling at least one of the correlation units. In the matched filter, the multiplexer may be constructed by a tri-state buffer.

Alternatively, the matched filter may be constructed from cells each designed for one of the correlation units by the standard cell method. The matched filter may also comprise a coefficient generator for generating a series of coefficients, having a shift register to sequentially input and hold each of the coefficients therein and shift in turn the coefficients one after another. The matched filter may be utilized for a receiver in a code division multiple access system.

In accordance with a second aspect of the present invention, there is provided a matched filter being adapted to the over-sampling of the input signal at a chip rate of n sampling times to one chip duration.

In accordance with a third aspect of the present invention, there is provided a method of synchronizing a phase of an input wave signal with that of a desired wave signal, comprising the steps of:
(a) calculating a correlation value between the input signal and a predetermined coefficient;
(b) changing the coefficient to another coefficient;
(c) repeating the steps (a) and (b) at predetermined intervals in a predetermined operation cycle;
(d) outputting the correlation value obtained in the step (c) after a lapse of the operation cycle; and
(e) repeating the steps (a) to (d).

In this method, the step (a) may comprise the steps of:
(a1) multiplying the input signal by the coefficient; and
(a2) integrating the product obtained in the step (a1) over the operation cycle.

In the method, the number of intervals represents a spreading ratio in the input signal. In the method, the step (b) may have the step of varying the coefficient in response to a predetermined code sequence for the input signal at the intervals. The method may be utilized for a receiver in a code division multiple access system.

In accordance with a fourth aspect of the present invention, there is provided a method as set forth in the third aspect further comprising the steps of:
sampling the input signal at a chip rate of n sampling times to one chip duration, so as to replace the sampled signal with the input signal in the step (a);
synchronizing the phase of the input wave signal with that of the desired wave signal on the basis of the correlation values obtained by the step (d).

BRIEF DESCRIPTION OF THE DRAWINGS

The present invention and many of the advantages, thereof will be better understood from the following detailed description when considered in connection with the accompanying drawings, wherein.

DESCRIPTION OF THE PREFERRED EMBODIMENTS

Figure 1:
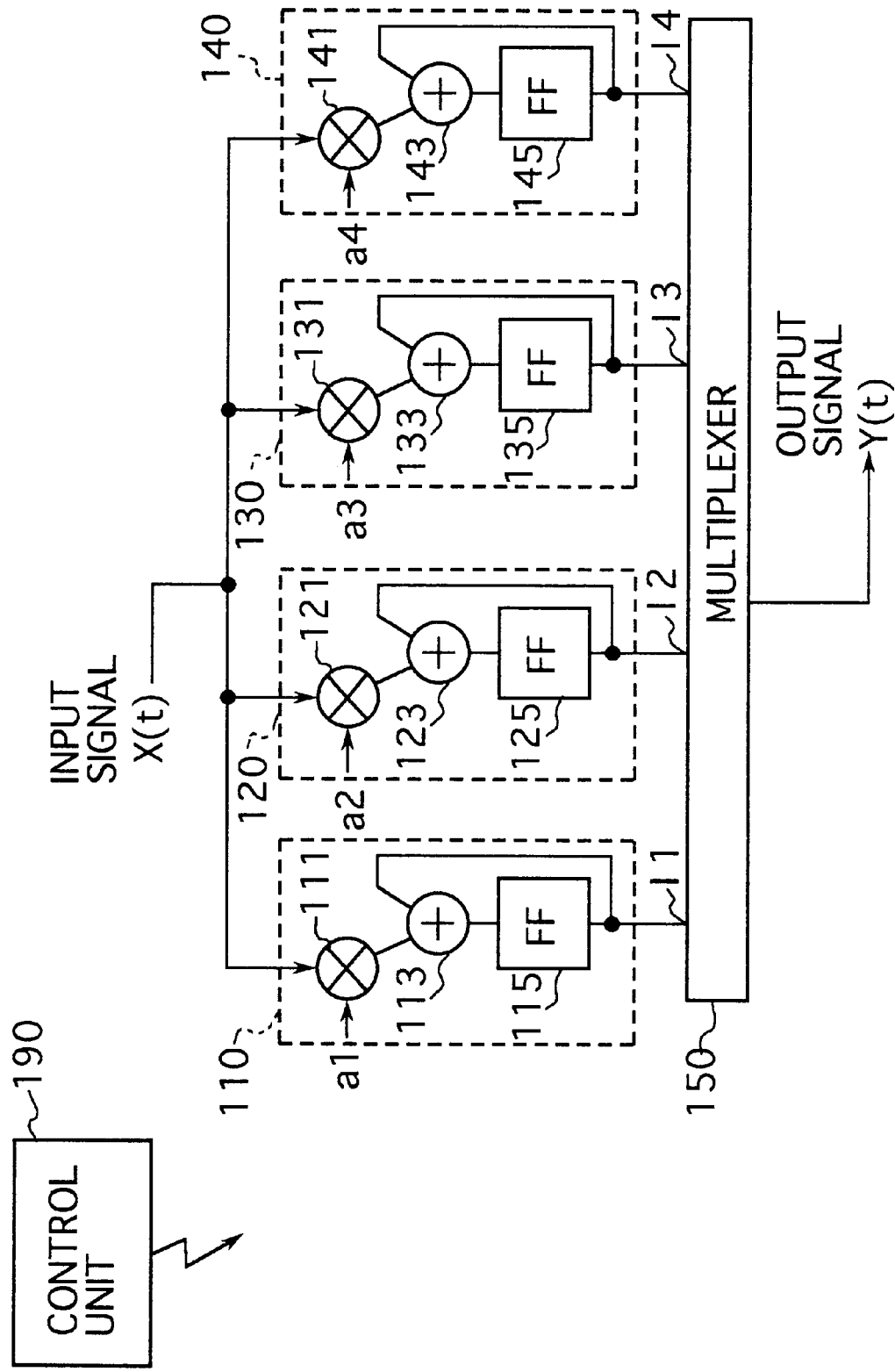
FIG. 1 is a block diagram showing a first preferred embodiment of the matched filter according to the present invention.
Figure 2:
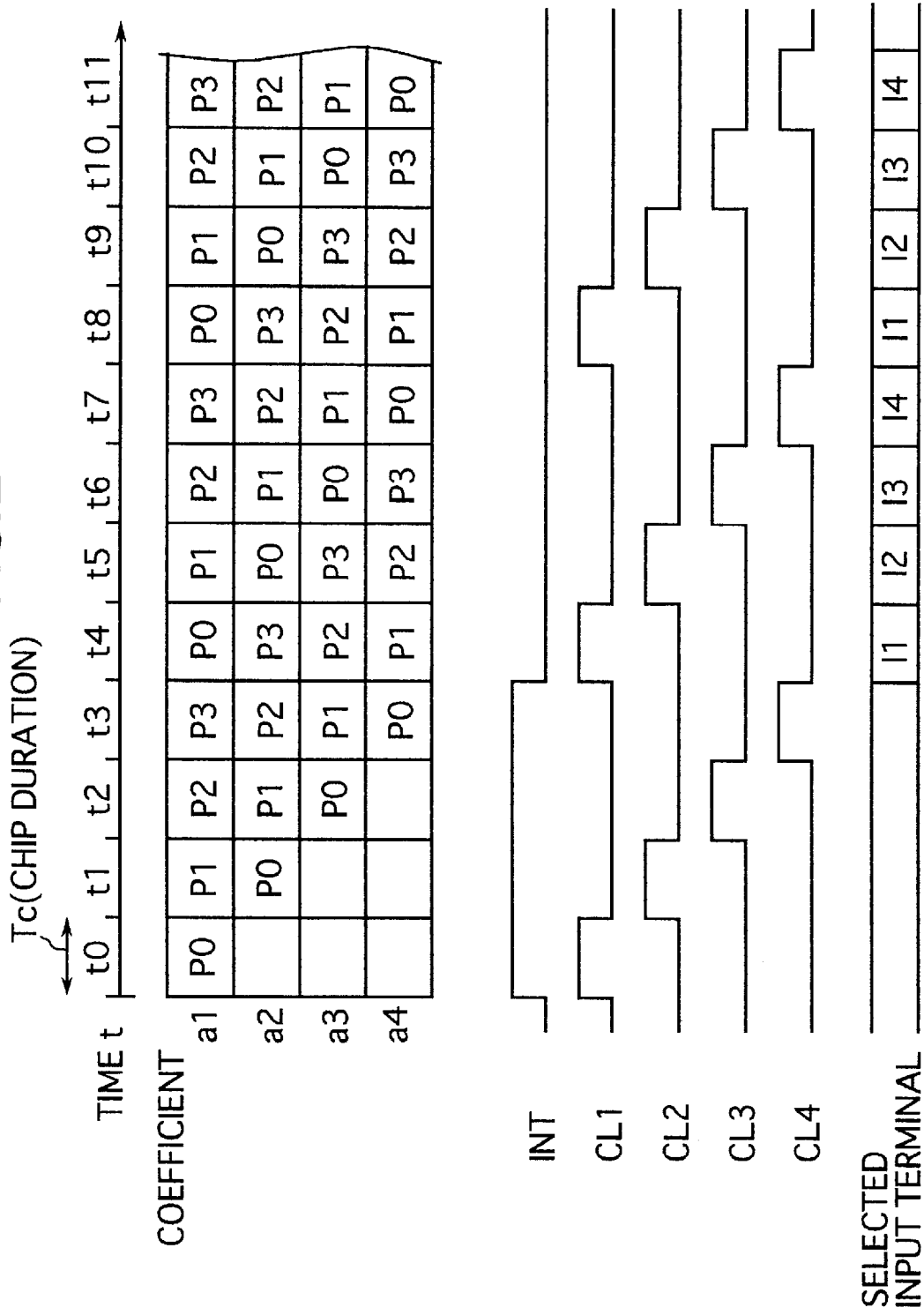
FIG. 2 is a timing chart of the operation of the matched filter shown in FIG. 1.

Referring to FIGS. 1 and 2 of the drawings, there is shown a first preferred embodiment of the matched filter according to the present invention. As shown in FIG. 1, the matched filter comprises first, second, third and fourth correlators 110, 120, 130 and 140 and a multiplexer 150 electrically connected to the first, second, third and fourth correlators 110, 120, 130 and 140 through first, second, third and fourth input terminals I1, I2, I3 and I4, respectively. Here, FIG. 1 merely illustrates an equivalent circuit forming part of the matched filter. In this embodiment, the spreading ratio of the matched filter in the CDMA system is assumed to be four chips to one sequence period T.

The matched filter further comprises a control unit 190 for providing a plurality of control signals for the first, second, third and fourth correlators 110, 120, 130 and 140, so that the operation timing of the matched filter is controlled in response to the control signals. The control signals include first, second, third and fourth control signals and an initialization signal represented by the reference characters "CL1", "CL2", "CL3", "CL4" and "INT", respectively, as shown in FIG. 2. The first, second, third and fourth control signals CL1, CL2, CL3 and CL4 are sequentially outputted chip by chip. These operations are repeated every four chips, i.e., one sequence period T. The initialization signal INT is initially outputted for four times as long as the chip duration Tc. The correlation values are calculated by the first, second, third and fourth correlators 110, 120, 130 and 140 in response to the first, second, third and fourth control signals CL1, CL2, CL3 and CL4, respectively.

The first correlator 110 has a multiplier 111, an adder 113 and a hold unit 115. The multiplier 111 has an input terminal and an output terminal and is designed to multiply data inputted through the input terminal by a predetermined first coefficient a1 at a predetermined interval, i.e., chip by chip, and output the product through the output terminal. The first coefficient a1 is varied in response to a predetermined code sequence having a predetermined pattern repeatedly appearing and including four codes represented by the reference characters "P0, P1, P2 and P3" in FIG. 2. In this embodiment, the reference characters P0, P1, P2 and P3 indicate data at each distortion of the phase of the desired signal corresponding to each chip in the one sequence period T. The code sequence starts appearing and is repeated with the first control signal CL1 received by the first correlator 110.

The adder 113 of the first correlator 110 has first and second input terminals and an output terminal. The adder 113 of the first correlator 110 is designed to add data inputted through the first input terminal to data inputted from the second input terminal to output the sum through the output terminal.

The hold unit 115 has input and output terminals and is designed to hold data inputted through the input terminal during the operation cycle, to output the held data after a lapse of one operation cycle and to reset the held data after the held data is outputted through the output terminal. The hold unit 115 may be constructed from a flip-flop circuit. The adder 113 and the hold unit 115 integrally form an integrator. The integrator is operated to integrate data inputted from the multiplier 111 over the operation cycle, i.e., four times as long as the chip duration Tc, into a correlation value to be outputted and then to be reset after a lapse of one operation cycle.

As shown in FIG. 1, the adder 113 of the first correlator 110 is electrically connected to the output terminal of the multiplier 111 of the first correlator 110 through the first input terminal of the adder 113 of the first correlator 110. The adder 113 of the first correlator 110 is also electrically connected to the output terminal of the hold unit 115 of the first correlator 110 through the second input terminal of the adder 113 of the first correlator 110, so that the data held in the hold unit 115 of the first correlator 110 is fed back to the adder 113 of the first correlator 110. The hold unit 115 of the first correlator 110 is electrically connected to the output terminal of the adder 113 of the first correlator 110 through the input terminal of the hold unit 115 of the first correlator 110.

The second correlator 120 has a multiplier 121, an adder 123 and a hold unit 125. The multiplier 121 has an input terminal and an output terminal and is designed to multiply data inputted through the input terminal by a predetermined first coefficient a2 every four chips and output the product through the output terminal. The second coefficient a2 is varied in response to the code sequence identical with that of the first coefficient a1. The code sequence starts appearing and is repeated with the second control signal CL2 received by the second correlator 120.

The adder 123 of the second correlator 120 has first and second input terminals and an output terminal. The adder 123 of the second correlator 120 is designed to add data inputted through the first input terminal to data inputted from the second input terminal to output the sum through the output terminal.

The hold unit 125 has input and output terminals and is designed to hold data inputted through the input terminal over the operation cycle, to output the held data after a lapse of the operation cycle and to reset the held data after the held data is outputted through the output terminal. The hold unit 125 may be constructed from a flip-flop circuit. The adder 123 and the hold unit 125 integrally form an integrator. The integrator is operated to integrate data inputted from the multiplier 121 over the operation cycle into a correlation value to be outputted and then to be reset after a lapse of one operation cycle.

As shown in FIG. 1, the adder 123 of the second correlator 120 is electrically connected to the output terminal of the multiplier 121 of the second correlator 120 through the first input terminal of the adder 123 of the second correlator 120. The adder 123 of the second correlator 120 is also electrically connected to the output terminal of the hold unit 125 of the second correlator 120 through the second input terminal of the adder 123 of the second correlator 120, so that the data held in the hold unit 125 of the second correlator 120 is fed back to the adder 123 of the second correlator 120. The hold unit 125 of the second correlator 120 is electrically connected to the output terminal of the adder 123 of the second correlator 120 through the input terminal of the hold unit 125 of the second correlator 120.

The third correlator 130 has a multiplier 131, an adder 133 and a hold unit 135. The multiplier 131 has an input terminal and an output terminal and is designed to multiply data inputted through the input terminal by a predetermined first coefficient a3 every four chips and output the product through the output terminal. The third coefficient a3 is varied in response to the code sequence identical with that of the first coefficient a1. The code sequence starts appearing and is repeated with the third control signal CL3 received by the third correlator 130.

The adder 133 of the third correlator 130 has first and second input terminals and an output terminal. The adder 133 of the third correlator 130 is designed to add data inputted through the first input terminal to data inputted from the second input terminal to output the sum through the output terminal.

The hold unit 135 has input and output terminals and is designed to hold data inputted through the input terminal over the operation cycle, to output the held data after a lapse of the operation cycle and to reset the held data after the held data is outputted through the output terminal. The hold unit 135 may be constructed from a flip-flop circuit. The adder 133 and the hold unit 135 integrally form an integrator. The integrator is operated to integrate data inputted from the multiplier 131 over the operation cycle into a correlation value to be outputted and then to be reset after a lapse of one operation cycle.

As shown in FIG. 1, the adder 133 of the third correlator 130 is electrically connected to the output terminal of the multiplier 131 of the third correlator 130 through the first input terminal of the adder 133 of the third correlator 130. The adder 133 of the third correlator 130 is also electrically connected to the output terminal of the hold unit 135 of the third correlator 130 through the second input terminal of the adder 133 of the third correlator 130, so that the data held in the hold unit 135 of the third correlator 130 is fed back to the adder 133 of the third correlator 130. The hold unit 135 of the third correlator 130 is electrically connected to the output terminal of the adder 133 of the third correlator 130 through the input terminal of the hold unit 135 of the third correlator 130.

The fourth correlator 140 has a multiplier 141, an adder 143 and a hold unit 145. The multiplier 141 has an input terminal and an output terminal and is designed to multiply data inputted through the input terminal by a predetermined first coefficient a4 every four chips and output the product through the output terminal. The fourth coefficient a4 is varied in response to the code sequence identical with that of the first coefficient a1. The code sequence starts appearing and is repeated with the fourth control signal CL4 received by the fourth correlator 140.

The adder 143 of the fourth correlator 140 has first and second input terminals and an output terminal. The adder 143 of the fourth correlator 140 is designed to add data inputted through the first input terminal to data inputted from the second input terminal to output the sum through the output terminal.

The hold unit 145 has input and output terminals and is designed to hold data inputted through the input terminal over the operation cycle, to output the held data after a lapse of the operation cycle and to reset the held data after the held data is outputted through the output terminal. The hold unit 145 may be constructed from a flip-flop circuit. The adder 143 and the hold unit 145 integrally form an integrator. The integrator is operated to integrate data inputted from the multiplier 141 over the operation cycle into a correlation value to be outputted and then to be reset after a lapse of one operation cycle.

As shown in FIG. 1, the adder 143 of the fourth correlator 140 is electrically connected to the output terminal of the multiplier 141 of the fourth correlator 140 through the first input terminal of the adder 143 of the fourth correlator 140. The adder 143 of the fourth correlator 140 is also electrically connected to the output terminal of the hold unit 145 of the fourth correlator 140 through the second input terminal of the adder 143 of the fourth correlator 140, so that the data held in the hold unit 145 of the fourth correlator 140 is fed back to the adder 143 of the fourth correlator 140. The hold unit 145 of the fourth correlator 140 is electrically connected to the output terminal of the adder 143 of the fourth correlator 140 through the input terminal of the hold unit 145 of the fourth correlator 140.

The multiplexer 150 is designed to input the correlation values from the first, second, third and fourth correlators 110, 120, 130 and 140 through the first, second, third and fourth input terminals I1, I2, I3 and I4, respectively, and to selectively output one of the correlation values through the output terminal in sequence at the intervals after the correlation values are integrated over the operation cycle, i.e., four chips. The multiplexer 150 is designed to be enabled for outputting one of the correlation values in response to the control signals received from the control unit 190. The outputted correlation value corresponds to the received control signal. The multiplexer 150 is further designed to be disabled from outputting any inputted data, while the initialization signal INT is received.

The manner of the operation of the matched filter described above will now be explained with reference to FIGS. 1 and 2.

The signal represented by the reference character "X(t)" in FIG. 1 is inputted to the first, second, third and fourth correlators 110, 120, 130 and 140 through the input terminal of the first, second, third and fourth correlators 110, 120, 130 and 140.

In this embodiment, the first, second, third and fourth coefficients a1, a2, a3 and a4 indicate the data at each distortion of the phase of the desired signal as described above. In the CDMA system, the reference code sequence is generally constructed from a series of codes being +1 or −1. The receiver can identify the input signal as the desired wave signal on the basis of this type of code sequence. In this embodiment, the spreading ratio of the matched filter is four chips to one sequence period T, therefore, a series of codes, i.e., the coefficients, repeatedly appears the same pattern including four bits every one sequence period T.

At the first time t0, the first correlator 110 starts operating in response to the first control signal CL1. At the same time, the second, third and fourth correlators 120, 130 and 140 are disabled. In the multiplier 111 of the first correlator 110, the first coefficient a1 is set to the first code P0. The input signal X(t0) is multiplied by the first coefficient a1, i.e., the first code P0, by the multiplier 111 of the first correlator 110 to output the product to the adder 113 of the first correlator 110. At first, the hold unit 115 of the first correlator 110 is initialized, so that the preserved data held in the hold unit 115 of the first correlator 110 is 0. The preserved data is fed back to the adder 113 of the first correlator 110 through the second input terminal of the adder 113 of the first correlator 110. Therefore, the product inputted through the first input terminal of the adder 113 of the first correlator 110 is added to the feed-back, i.e., 0, to output the sum to the hold unit 115 of the first correlator 110. The sum is held in the hold unit 115 of the first correlator 110. At this time, the multiplexer 150 is disabled from outputting any inputted data in response to the initialization signal INT.

At the second time t1, the second correlator 120 starts operating in response to the second control signal CL2, while the first correlator 110 continues to operate. At the same time, the third and fourth correlators 130 and 140 are disabled.

At this time, in the multiplier 111 of the first correlator 110, the first coefficient a1 is set to the second code P1. The input signal X(t1) is multiplied by the first coefficient a1, i.e., the second code P1, by the multiplier 111 of the first correlator 110 to output the product to the adder 113 of the first correlator 110. At this time, the preserved data held in the hold unit 115 of the first correlator 110 is fed back to the adder 113 of the first correlator 110 through the second input terminal of the adder 113 of the first correlator 110. The product inputted through the first input terminal of the adder 113 of the first correlator 110 is added to the feed-back to output the sum to the hold unit 115 of the first correlator 110. The sum is held in the hold unit 115 of the first correlator 110.

At the same time, in the multiplier 121 of the second correlator 120, the second coefficient a2 is set to the first code P0. Then, the input signal X(t1) is also multiplied by the second coefficient a2, i.e., the first code P0, by the multiplier 121 of the second correlator 120 to output the product to the adder 123 of the second correlator 120. The hold unit 125 of the second correlator 120 is initialized, so that the preserved data held in the hold unit 125 of the second correlator 120 is 0. The preserved data is fed back to the adder 123 of the second correlator 120 through the second input terminal of the adder 123 of the second correlator 120. Therefore, the product inputted through the first input terminal of the adder 123 of the second correlator 120 is added to the feed-back, i.e., 0, to output the sum to the hold unit 125 of the second correlator 120. The sum is held in the hold unit 125 of the second correlator 120. At this time, the multiplexer 150 is disabled from outputting any inputted data in response to the initialization signal INT.

At the third time t2, the third correlator 130 starts operating in response to the third control signal CL3, while the first and second correlators 110 and 120 continue to operate. At the same time, the fourth correlator 140 is disabled.

At this time, in the multiplier 111 of the first correlator 110, the first coefficient a1 is set to a third code P2. The input signal X(t2) is multiplied by the first coefficient a1, i.e., the third code P2, by the multiplier 111 of the first correlator 110 to output the product to the adder 113 of the first correlator 110. At this time, the preserved data held in the hold unit 115 of the first correlator 110 is fed back to the adder 113 of the first correlator 110 through the second input terminal of the adder 113 of the first correlator 110. The product inputted through the first input terminal of the adder 113 of the first correlator 110 is added to the feed-back to output the sum to the hold unit 115 of the first correlator 110. The sum is held in the hold unit 115 of the first correlator 110.

At the same time, in the multiplier 121 of the second correlator 120, the second coefficient a2 is set to the second code P1. Then, the input signal X(t2) is also multiplied by the second coefficient a2, i.e., the second code P1, by the multiplier 121 of the second correlator 120 to output the product to the adder 123 of the second correlator 120. The preserved data held in the hold unit 125 of the second correlator 120 is fed back to the adder 123 of the second correlator 120 through the second input terminal of the adder 123 of the second correlator 120. The product inputted through the first input terminal of the adder 123 of the second correlator 120 is added to the feed-back to output the sum to the hold unit 125 of the second correlator 120. The sum is held in the hold unit 125 of the second correlator 120.

At the same time, in the multiplier 131 of the third correlator 130, the second coefficient a2 is set to the first code P0. Then, the input signal X(t2) is also multiplied by the second coefficient a2, i.e., the first code P0, by the multiplier 131 of the third correlator 130 to output the product to the adder 133 of the third correlator 130. The hold unit 135 of the third correlator 130 is initialized, so that the preserved data held in the hold unit 135 of the third correlator 130 is 0. The preserved data is fed back to the adder 133 of the third correlator 130 through the second input terminal of the adder 133 of the third correlator 130. Therefore, the product inputted through the first input terminal of the adder 133 of the third correlator 130 is added to the feed-back, i.e., 0, to output the sum to the hold unit 135 of the third correlator 130. The sum is held in the hold unit 135 of the third correlator 130. At this time, the multiplexer 150 is disabled from outputting any inputted data in response to the initialization signal INT.

At the fourth time t3, the fourth correlator 140 starts operating in response to the fourth control signal CL4, while the first to third correlators 110 to 130 continue to operate.

At this time, in the multiplier 111 of the first correlator 110, the first coefficient a1 is set to the fourth code P3. The input signal X(t3) is multiplied by the first coefficient a1, i.e., the fourth code P3, by the multiplier 111 of the first correlator 110 to output the product to the adder 113 of the first correlator 110. The preserved data held in the hold unit 115 of the first correlator 110 is fed back to the adder 113 of the first correlator 110 through the second input terminal of the adder 113 of the first correlator 110. The product inputted through the first input terminal of the adder 113 of the first correlator 110 is added to the feed-back to output the sum to the hold unit 115 of the first correlator 110. The sum is held in the hold unit 115 of the first correlator 110.

At the same time, in the multiplier 121 of the second correlator 120, the second coefficient a2 is set to the third code P2. Then, the input signal X(t3) is also multiplied by the second coefficient a2, i.e., the third code P2, by the multiplier 121 of the second correlator 120 to output the product to the adder 123 of the second correlator 120. The preserved data held in the hold unit 125 of the second correlator 120 is fed back to the adder 123 of the second correlator 120 through the second input terminal of the adder 123 of the first correlator 110. The product inputted through the first input terminal of the adder 123 of the second correlator 120 is added to the feed-back to output the sum to the hold unit 125 of the second correlator 120. The sum is held in the hold unit 125 of the second correlator 120.

At the same time, in the multiplier 131 of the third correlator 130, the third coefficient a3 is set to the second code P1. Then, the input signal X(t3) is also multiplied by the third coefficient a3, i.e., the second code P1, by the multiplier 131 of the third correlator 130 to output the product to the adder 133 of the third correlator 130. The preserved data held in the hold unit 135 of the third correlator 130 is fed back to the adder 133 of the third correlator 130 through the second input terminal of the adder 133 of the third correlator 130. The product inputted through the first input terminal of the adder 133 of the third correlator 130 is added to the feed-back to output the sum to the hold unit 135 of the third correlator 130. The sum is held in the hold unit 135 of the third correlator 130.

At the same time, in the multiplier 141 of the fourth correlator 140, the fourth coefficient a4 is set to the first code P0. Then, the input signal X(t3) is also multiplied by the fourth coefficient a4, i.e., the first code P0, by the multiplier 131 of the fourth correlator 140 to output the product to the adder 143 of the fourth correlator 140. The hold unit 145 of the fourth correlator 140 is initialized, so that the preserved data held in the hold unit 145 of the fourth correlator 140 is 0. The preserved data is fed back to the adder 143 of the fourth correlator 140 through the second input terminal of the adder 143 of the fourth correlator 140. Therefore, the product inputted through the first input terminal of the adder 143 of the fourth correlator 140 is added to the feed-back, i.e., 0, to output the sum to the hold unit 145 of the fourth correlator 140. The sum is held in the hold unit 145 of the fourth correlator 140. At this time, the multiplexer 150 is disabled from outputting any inputted data in response to the initialization signal INT.

At the fifth time t4, the initialization signal INT is reset, accordingly, the multiplexer 150 is enabled to output the inputted data in response to the received control signal. At this time, the first control signal CL1 is received by the multiplexer 150, then the first input terminal I1 is selectively connected to the output terminal. Then, the data obtained by the hold unit 115 of the first correlator 110 is outputted as the output signal Y(t4) from the multiplexer 150 through the output terminal of the multiplexer 150. The output signal Y(t4) indicates the correlation value integrated over four chips from the first time t0 to the fourth time t3.

At the same time, the first correlator 110 is reset, therefore, the preserved data held in the hold unit 115 of the first correlator 110 is 0. The first correlator 110 restarts operating in response to the first control signal CL1. In the multiplier 111 of the first correlator 110, the first coefficient a1 is set to the first code P0. The input signal X(t4) is multiplied by the first coefficient a1, i.e., the first code P0, by the multiplier 111 of the first correlator 110 to output the product to the adder 113 of the first correlator 110. The preserved data held in the hold unit 115 of the first correlator 110 is fed back to the adder 113 of the first correlator 110 through the second input terminal of the adder 113 of the first correlator 110. The product inputted through the first input terminal of the adder 113 of the first correlator 110 is added to the feed-back, i.e., 0, to output the sum to the hold unit 115 of the first correlator 110. The sum is held in the hold unit 115 of the first correlator 110.

At the same time, in the multiplier 121 of the second correlator 120, the second coefficient a2 is set to the fourth code P3. Then, the input signal X(t4) is also multiplied by the second coefficient a2, i.e., the fourth code P3, by the multiplier 121 of the second correlator 120 to output the product to the adder 123 of the second correlator 120. The preserved data held in the hold unit 125 of the second correlator 120 is fed back to the adder 123 of the second correlator 120 through the second input terminal of the adder 123 of the second correlator 120. The product inputted through the first input terminal of the adder 123 of the second correlator 120 is added to the feed-back to output the sum to the hold unit 125 of the second correlator 120. The sum is held in the hold unit 125 of the second correlator 120.

At the same time, in the multiplier 131 of the third correlator 130, the third coefficient a3 is set to the third code P. Then, the input signal X(t4) is also multiplied by the third coefficient a3, i.e., the third code P2, by the multiplier 131 of the third correlator 130 to output the product to the adder 133 of the third correlator 130. The preserved data held in the hold unit 135 of the third correlator 130 is fed back to the adder 133 of the third correlator 130 through the second input terminal of the adder 133 of the third correlator 130. The product inputted through the first input terminal of the adder 133 of the third correlator 130 is added to the feed-back to output the sum to the hold unit 135 of the third correlator 130. The sum is held in the hold unit 135 of the third correlator 130.

At the same time, in the multiplier 141 of the fourth correlator 140, the fourth coefficient a4 is set to the second code P1. Then, the input signal X(t4) is also multiplied by the fourth coefficient a4, i.e., the second code P1, by the multiplier 141 of the fourth correlator 140 to output the product to the adder 143 of the fourth correlator 140. The preserved data held in the hold unit 145 of the fourth correlator 140 is fed back to the adder 143 of the fourth correlator 140 through the second input terminal of the adder 143 of the fourth correlator 140. The product inputted through the first input terminal of the adder 143 of the fourth correlator 140 is added to the feed-back to output the sum to the hold unit 145 of the fourth correlator 140. The sum is held in the hold unit 145 of the fourth correlator 140.

In the following operations shown in FIG. 2, at the sixth time t5, the second control signal CL2 is received by the multiplexer 150, then the second input terminal I2 is selectively connected to the output terminal. Then, the data obtained by the hold unit 125 of the second correlator 120 is outputted as the output signal Y(t5) from the multiplexer 150 through the output terminal of the multiplexer 150. The output signal Y(t5) indicates the correlation value integrated over the four chips from the second time t1 to the fifth time t4.

The first, second, third and fourth correlators 110, 120, 130 and 140 repeat the aforementioned operations chip by chip in the following seventh and eighth times t6 and t7 to obtain the correlation value integrated over the four chips in the third and fourth correlators 130 and 140, respectively. The correlation values obtained by the third and fourth correlators 130 and 140 are outputted to the multiplexer 150 at the seventh and eighth times t6 and t7, respectively.

At the seventh time t6, the third input terminal I3 is selectively connected to the output terminal in response to the third control signal CL3. Then, the data obtained by the hold unit 135 of the third correlator 130 is outputted as the output signal Y(t6) from the multiplexer 150 through the output terminal of the multiplexer 150. The data thus outputted indicates the correlation value integrated over four chips from the third time t2 to the sixth time t5.

At the eighth time t7, the fourth input terminal I4 is selectively connected to the output terminal in response to the fourth control signal CL4. Then, the data obtained by the hold unit 145 of the fourth correlator 140 is outputted as the output signal Y(t7) from the multiplexer 150 through the output terminal of the multiplexer 150. The data thus outputted indicates the correlation value integrated over four chips from the fourth time t3 to the seventh time t6.

In this embodiment, the integrators of each correlator is performed by the product-sum operation since the desired wave signal is constructed from a series of codes indicated by +1 or −1. Alternatively, the matched filter may be adapted to the reference code sequence being constructed from a series of codes indicated by 1 or 0. This type of matched filter may comprise a logic exclusive-OR circuit in each correlator.

The first embodiment of the matched filter according to the present invention has an advantage over the prior art in decreasing the power consumption. In comparison with the prior art, the matched filter according to the present invention can be operated at low speeds. Therefore, the matched filter can be operated without a large amount of electric power.

Figure 3:
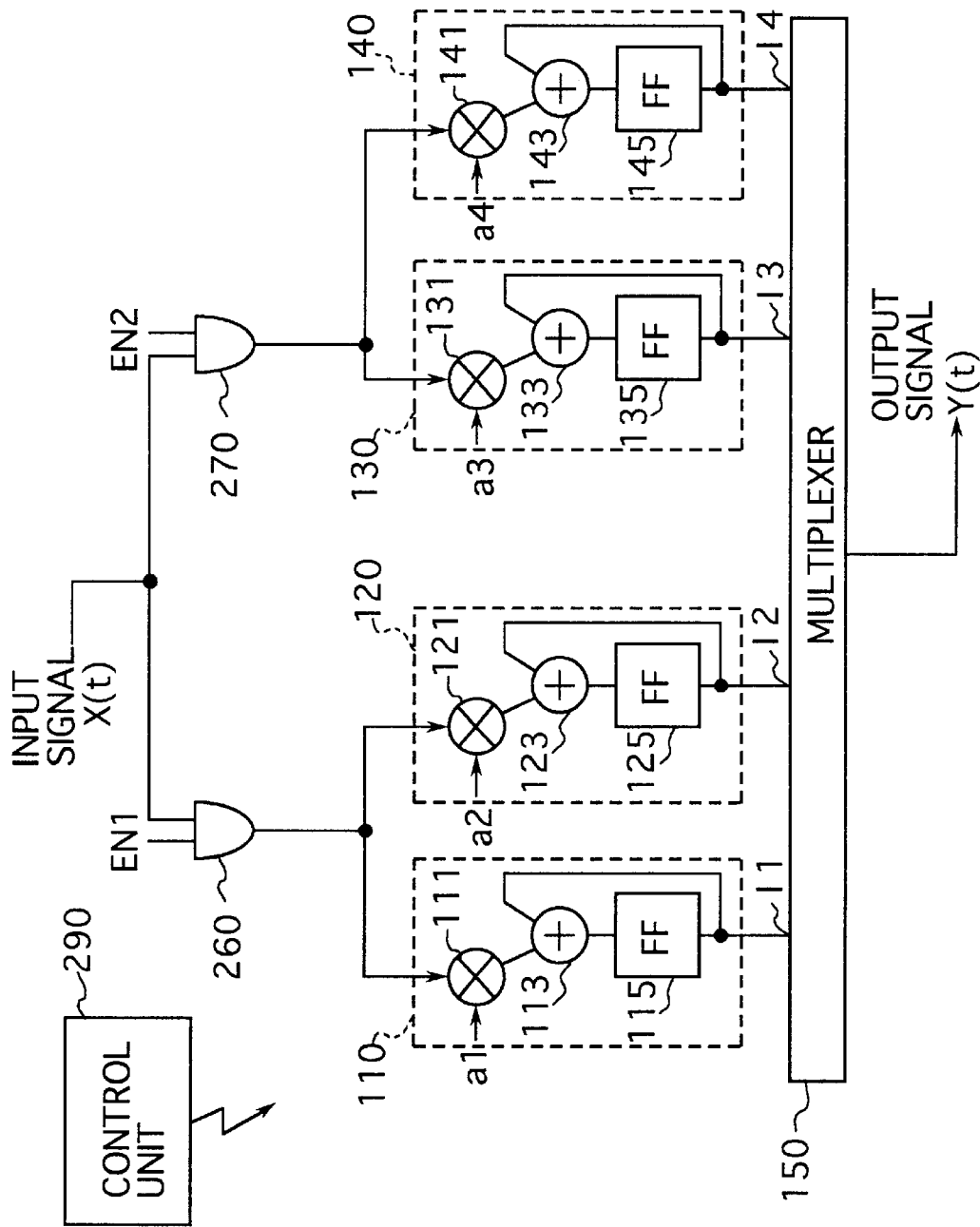
FIG. 3 is a block diagram showing a second preferred embodiment of the matched filter according to the present invention.

Referring to FIG. 3 of the drawings, there is shown a second preferred embodiment of the matched filter according to the present invention. As shown in FIG. 3, the matched filter partially includes the same means and elements as those of the first embodiment. The same means and elements as those of the first embodiment are respectively designated by the same reference numerals 110 through 150 as those of the first embodiment.

The second embodiment of the matched filter comprises first and second enabling units 260 and 270 and a control unit 290. The control unit 290 is designed to provide the matched filter with a plurality of control signals including the first through fourth control signals CL1, CL2, CL3 and CL4 and the initialization signal INT which are the same as those of the first embodiment and first and second enable signals EN1 and EN2.

The first enabling unit 260 has a first input terminal through which the first enable signal EN1 is inputted, a second input terminal through which the input signal X(t) is inputted and an output terminal. The first enabling unit 260 is designed to carry out the logic AND between the first and second input terminals to obtain the result and to output the result through the output terminal. The first enabling unit 260 thus constructed can control the first and second correlators 110 and 120 in response to the first enable signal EN1. In the case where the first enable signal EN1 received by the first enabling unit 260 has a level of 1, the result, i.e., the input signal X(t), is outputted to the first and second correlators 110 and 120 through the output terminal. In the case where the first enable signal EN1 received by the first enabling unit 260 has a level of 0, the result, i.e., 0, is invariably outputted to the first and second correlators 110 and 120 through the output terminal.

The second enabling unit 270 has a first input terminal through which the second enable signal EN2 is inputted, a second input terminal through which the input signal X(t) is inputted and an output terminal. The second enabling unit 270 is designed to carry out the logic AND between the first and second input terminals to obtain the result and to output the result through the output terminal. The second enabling unit 270 thus constructed can control the third and fourth correlators 130 and 140 in response to the second enable signal EN2. In the case where the second enable signal EN2 received by the second enabling unit 270 has a level of 1, the result, i.e., the input signal X(t), is outputted to the third and fourth correlators 130 and 140 through the output terminal. In the case where the second enable signal EN2 received by the second enabling unit 270 has a level of 0, the result, i.e., 0, is invariably outputted to the third and fourth correlators 130 and 140 through the output terminal.

The multipliers 111 and 121 of the first and second correlators 110 and 120 are controlled by the control unit 290 in the following manner. When the first enable signal EN1 is received by the first and second correlators 110 and 120 having a level of 0, the first and second coefficients a1 and a2 are invariable in the multipliers 111 and 121 of the first and second correlators 110 and 120, respectively. The data thus inputted to the adders 113 and 123 of the first and second correlators 110 and 120 are invariable, thereby making it possible to decrease the power consumption in the matched filter according to the present invention for the following reasons. Since the hold units 115 and 125 of the first and second correlators 110 and 120 are constituted by a storage device such as a complementary metal-oxide semiconductor circuit "CMOS", the CMOS circuit has a tendency to increase the power consumption in proportion to the number of times of changes in switching the input signal. Resulting from inputting the invariable data to the hold units of the correlators, the matched filter can decrease the power consumption in comparison with the variable data is inputted to the hold units of the correlators.

The multipliers 131 and 141 of the third and fourth correlators 130 and 140 are also controlled by the control unit 290 in the following manner. When the second enable signal EN2 is received by the third and fourth correlators 130 and 140 having a level of 0, the third and fourth coefficients a3 and a4 are invariable in the multipliers 131 and 141 of the third and fourth correlators 130 and 140, respectively. The data thus inputted to the adders 133 and 143 of the third and fourth correlators 130 and 140 are invariable, thereby making it possible to decrease the power consumption in the matched filter according to the present invention for the same reasons as described above.

The matched filter thus constructed can be operated to select one from among two pairs of the correlators consisting of a first pair of the first and second correlators 110 and 120 and a second pair of the third and fourth correlators 130 and 140 in this embodiment. The selected pair of the correlator is enabled. The second embodiment of the matched filter according to the present invention has an advantage over the prior art in decreasing the power consumption by outputting the first and second enable signals EN1 and EN2.

Figure 4:
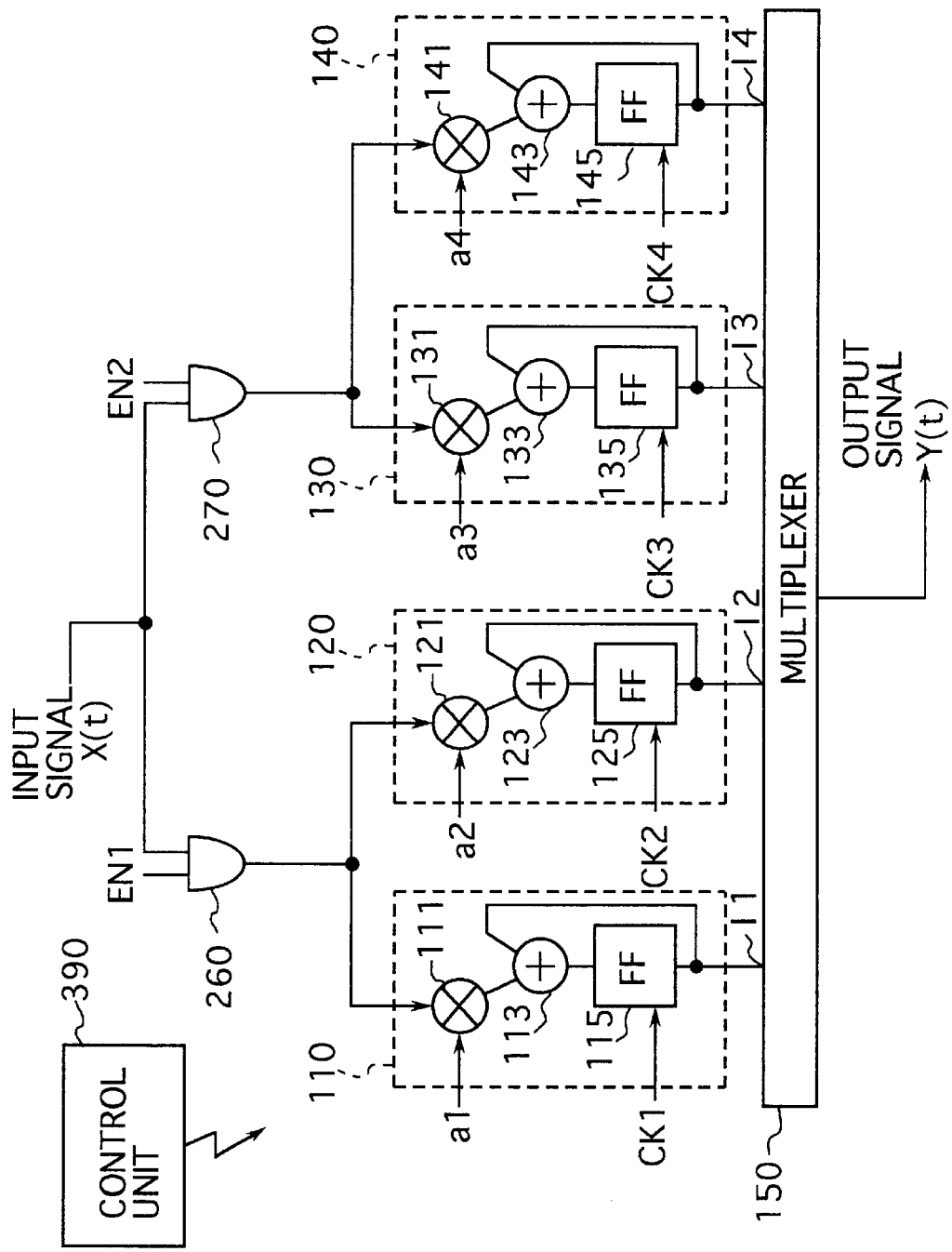
FIG. 4 is a block diagram showing a third preferred embodiment of the matched filter according to the present invention.

Referring to FIG. 4 of the drawings, there is shown a third preferred embodiment of the matched filter according to the present invention. As shown in FIG. 4, the matched filter partially includes the same means and elements as those of the first and second embodiments. The same means and elements as those of the first and second embodiments are respectively designated by the same reference numerals 110 through 270 as those of the first and second embodiments.

The third embodiment of the matched filter comprises a control unit 390. The control unit 390 is designed to provide the matched filter with a plurality of control signal including the first through fourth control signals CL1, CL2, CL3 and CL4 and the initialization signal INT same as those of the first embodiment and first and second enable signals EN1 and EN2 same as those of the second embodiment. The control unit 390 is further designed to supply first, second, third and fourth clock signals CK1, CK2, CK3 and CK4 for the hold units 115, 125, 135 and 145 of the first, second, third and fourth correlators 110, 120, 130 and 140, respectively.

In this embodiment, the first and second clock signals CK1 and CK2 are simultaneously supplied to a pair of the first and second correlators 110 and 120 so that the pair of the first and second correlators 110 and 120 are simultaneously enabled.

Conversely, the first and second clock signals CK1 and CK2 are restricted thereby disabling the pair of the first and second correlators 110 and 120 from operating. The third and fourth clock signals CK3 and CK4 are simultaneously supplied to a pair of the third and fourth correlators 130 and 140 so that the pair of the third and fourth correlators 130 and 140 are simultaneously enabled. Conversely, the third and fourth clock signals CK3 and CK4 are restricted thereby disabling the pair of the third and fourth correlators 130 and 140 from operating.

More specifically, the pair of the first and second correlators 110 and 120 are controlled by the control unit 390 in the following manner. In the case where the first enable signal EN1 is received by the first and second correlators 110 and 120 having a level of 0, the first and second coefficients a1 and a2, respectively, are invariable. The invariable data is inputted to the adders 113 and 123 of the first and second correlators 110 and 120 through the first input terminals of the adders 113 and 123 of the first and second correlators 110 and 120. At the same time, the first and second clock signals CK1 and CK2 are restricted, so that the hold units 115 and 125 of the first and second correlators 110 and 120 are disabled from operating. Therefore, the reserved data held in the hold units 115 and 125 of the first and second correlators 110 and 120 are invariable. Then, the invariable preserved data is fed back into the adders 113 and 123 of the first and second correlators 110 and 120 through the second input terminals of the adders 113 and 123 of the first and second correlators 110 and 120, respectively. This means that any data inputted to the adders 113 and 123 of the first and second correlators 110 and 120 are invariable, so that the pair of the first and second correlators 110 and 120 is disabled from operating.

In the case where the first enable signal EN1 is set to 1 from 0, the first and second coefficients a1 and a2 are supplied to the first and second correlators 110 and 120, respectively. Therefore, the data inputted to the adders 113 and 123 of the first and second correlators 110 and 120 through the first input terminals are variable. At the same time, the first and second clock signals CK1 and CK2 are supplied to the first and second correlators 110 and 120, accordingly, the hold units 115 and 125 of the first and second correlators 110 and 120 are enabled in response to the first and second clock signals CK1 and CK2, respectively. Therefore, the pair of the first and second correlators 110 and 120 is enabled.

The pair of the third and fourth correlators 130 and 140 are controlled by the control unit 390 in the following manner. In the case where the second enable signal EN2 is received by the third and fourth correlators 130 and 140 having a level of 0, the third and fourth coefficients a3 and a4, respectively, are invariable. The invariable data is inputted to the adders 133 and 143 of the third and fourth correlators 130 and 140 through the first input terminals of the adders 133 and 143 of the third and fourth correlators 130 and 140. At the same time, the third and fourth clock signals CK3 and CK4 are restricted, so that the hold units 135 and 145 of the third and fourth correlators 130 and 140 are disabled from operating. Therefore, the reserved data held in the hold units 135 and 145 of the third and fourth correlators 130 and 140 are invariable. Then, the invariable preserved data is fed back into the adders 133 and 143 of the third and fourth correlators 130 and 140 through the second input terminals of the adders 133 and 143 of the third and fourth correlators 130 and 140, respectively. This means that any data inputted to the adders 133 and 143 of the third and fourth correlators 130 and 140 are invariable so that the pair of the third and fourth correlators 130 and 140 are disabled from operating.

In the case where the second enable signal EN2 is set to 1 from 0, the third and fourth coefficients a3 and a4 are supplied to the third and fourth correlators 130 and 140, respectively. Therefore, the data inputted to the adders 133 and 143 of the third and fourth correlators 130 and 140 through the first input terminals are variable. At the same time, the third and fourth clock signals CK3 and CK4 are supplied to the third and fourth correlators 130 and 140, accordingly, the hold units 135 and 145 of the third and fourth correlators 130 and 140 are enabled in response to the third and fourth clock signals CK3 and CK4, respectively. Therefore, the pair of the third and fourth correlators 130 and 140 are enabled.

In this embodiment, the matched filter thus constructed can be operated to select one to be enabled from among two pairs of the correlators on the basis of the enable signals. The matched filter can further selectively operate the correlators in response to the clock signals. The third embodiment of the matched filter has an advantage over the prior art in decreasing the power consumption.

Figure 5:
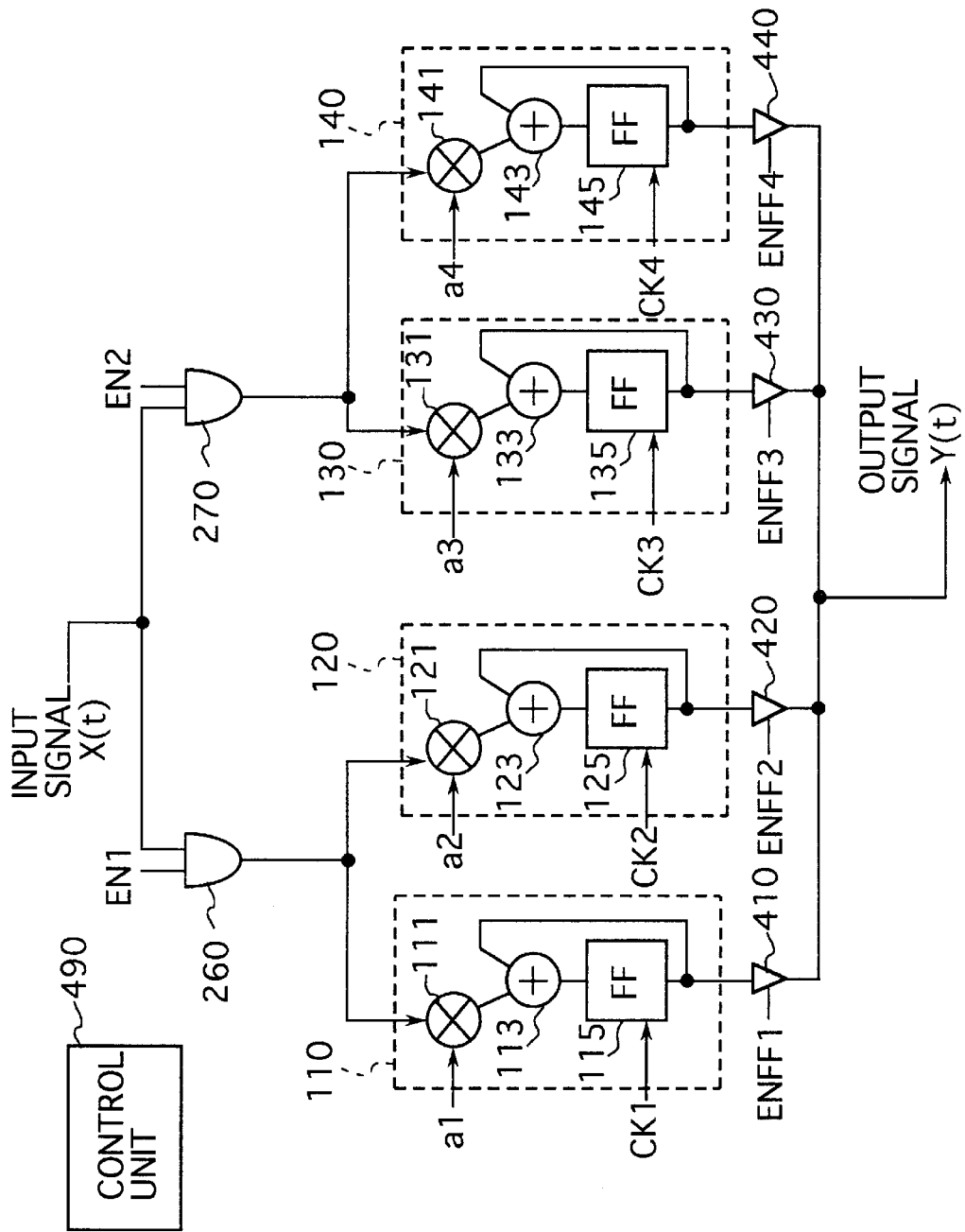
FIG. 5 is a block diagram showing a fourth preferred embodiment of the matched filter according to the present invention.

Referring to FIG. 5 of the drawings, there is shown a fourth preferred embodiment of the matched filter according to the present invention. As shown in FIG. 5, the matched filter partially includes the same means and elements as those of the first to third embodiments. The same means and elements as those of the first through third embodiments are respectively designated by the same reference numerals 110 through 270 as those of the first through third embodiments.

The fourth embodiment of the matched filter further comprises first, second, third and fourth tri-state buffers 410, 420, 430 and 440 and a control unit 490. The control unit 490 is designed to provide the matched filter with a plurality of control signal including the first through fourth control signals CL1, CL2, CL3 and CL4 and the initialization signal INT same as those of the first embodiment, the first and second enable signals EN1 and EN2 same as those of the second embodiment, and the first, second, third and fourth clock signals CK1, CK2, CK3 and CK4 same as those of the third embodiment. The control unit 490 is further designed to supply first, second, third and fourth hold enable signals ENFF1, ENFF2, ENFF3 and ENFF4 for the first, second, third and fourth tri-state buffers 410, 420, 430 and 440, respectively.

The first, second, third and fourth tri-state buffers 410, 420, 430 and 440 serve as the multiplexer 150 of the first embodiment. The first tri-state buffer 410 is electrically connected to the hold unit 115 of the first correlator 110 and designed to output the data in response to the first hold enable signal ENFF1. The second tri-state buffer 420 is electrically connected to the hold unit 125 of the second correlator 120 and designed to output the data in response to the second hold enable signal ENFF2. The third tri-state buffer 430 is electrically connected to the hold unit 135 of the third correlator 130 and designed to output the data in response to the third hold enable signal ENFF3. The fourth tri-state buffer 440 is electrically connected to the hold unit 145 of the fourth correlator 140 and designed to output the data in response to the fourth hold enable signal ENFF4.

The fourth embodiment of the matched filter can be provided at a low cost for the following reasons. Since the spreading ratio of the matched filter in this embodiment is assumed to be four chips to one sequence period T, the matched filter has four correlators. Accordingly, the multiplexer also has four input terminals through which the correlation values are inputted from the correlators, respectively. Since the matched filter needs to provide correlators corresponding to the spreading ratio, the number of correlators which is provided for the matched filter should be increased as the spreading ratio in the matched filter is increased. This results in the fact that the multiplexer has the input terminals corresponding to the correlators, so that the scale of the multiplexer in the circuit becomes large. However, the matched filter according to the present invention comprises a plurality of tri-state buffers to be served as the multiplexer, thereby decreasing the scale of the occupation of the tri-state buffers in comparison with that of the multiplexer.

Figure 6:
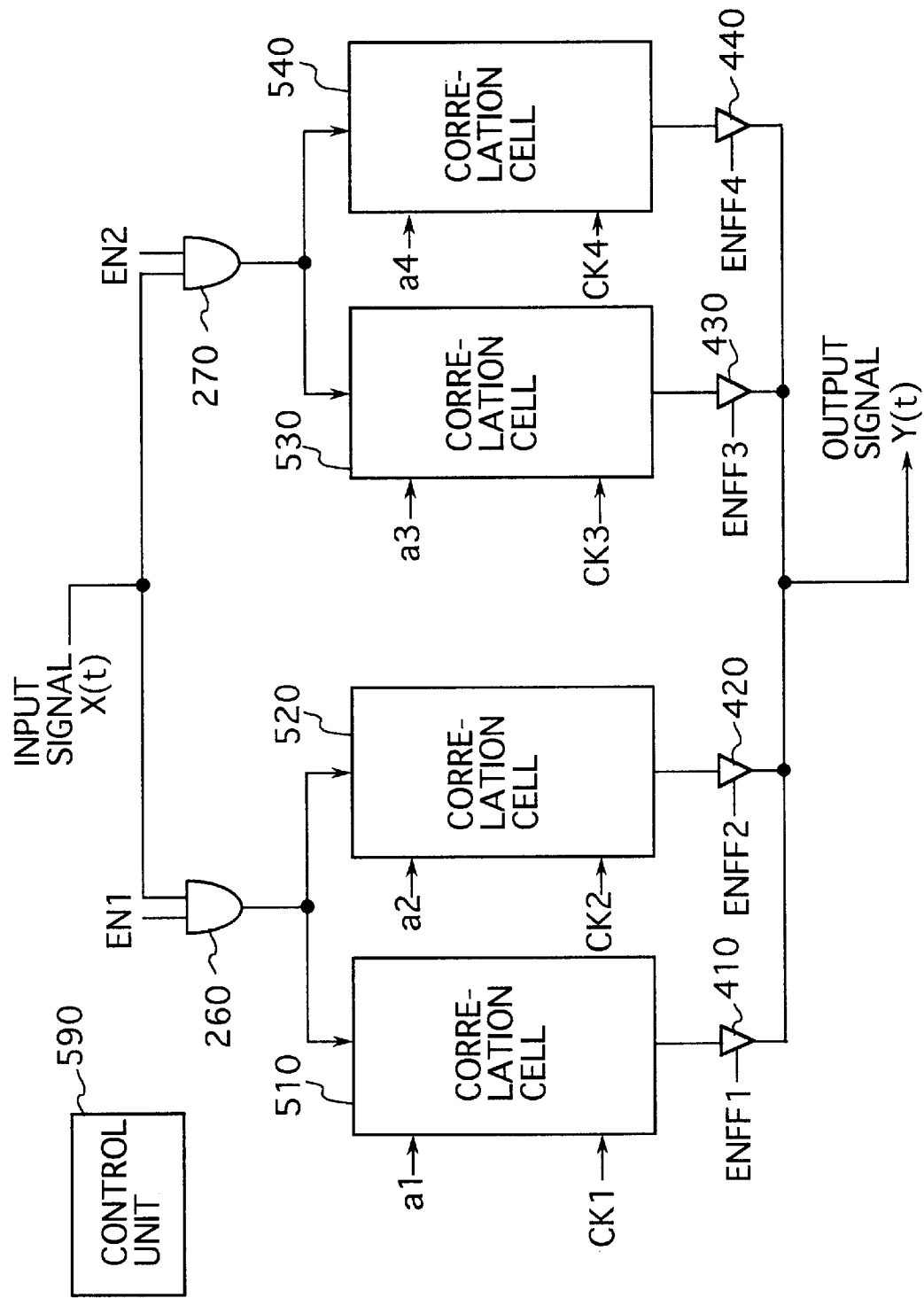
FIG. 6 is a block diagram showing a fifth preferred embodiment of the matched filter according to the present invention.

Referring to FIG. 6 of the drawings, there is shown a fifth preferred embodiment of the matched filter according to the present invention. As shown in FIG. 6, the matched filter partially includes the same means and elements as those of the second through fourth embodiments. The same means and elements as those of the second through fourth embodiments are respectively designated by the same reference numerals 260 through 490 as those of the second through fourth embodiments.

The fifth embodiment of the matched filter comprises first, second, third and fourth correlation cells 510, 520, 530 and 540.

The first, second, third and fourth correlation cells 510, 520, 530 and 540 are identical with each other. Each of the first, second, third and. fourth correlation cells 510, 520, 530 and 540 has a multiplier, an adder and a hold unit which is the same as those of the first embodiment of the correlators. The first, second, third and fourth correlation cells 510, 520, 530 and 540 function as the first, second, third and fourth correlators 110, 120, 130 and 140, respectively.

In this embodiment, each of the correlators in the first embodiment may be designed by the standard cell method, accordingly, regarded as a cell in the standard cell method. The fifth embodiment of the matched filter is constructed from a plurality of the cells. In this embodiment, the correlation cells are customized to be reduced in size, thereby also reducing the layout area for the correlation cells to that of the correlators which is designed in the custom method. This results in the fact that the present invention can provide the matched filter at low cost.

Furthermore, in the standard cell method, the capacity of load in the wiring from the correlation cells can be automatically detected by use of layout tools in the standard cell method. This means that the present invention can provide a matched filter which can be efficiently developed, thereby reducing the development period. Moreover, before the cell is performed to layout in the circuit, the present invention makes the cell enter into a library, thereby making it possible to determine an optional shape in layout based on the relationships between the other blocks in the design.

Figure 7:
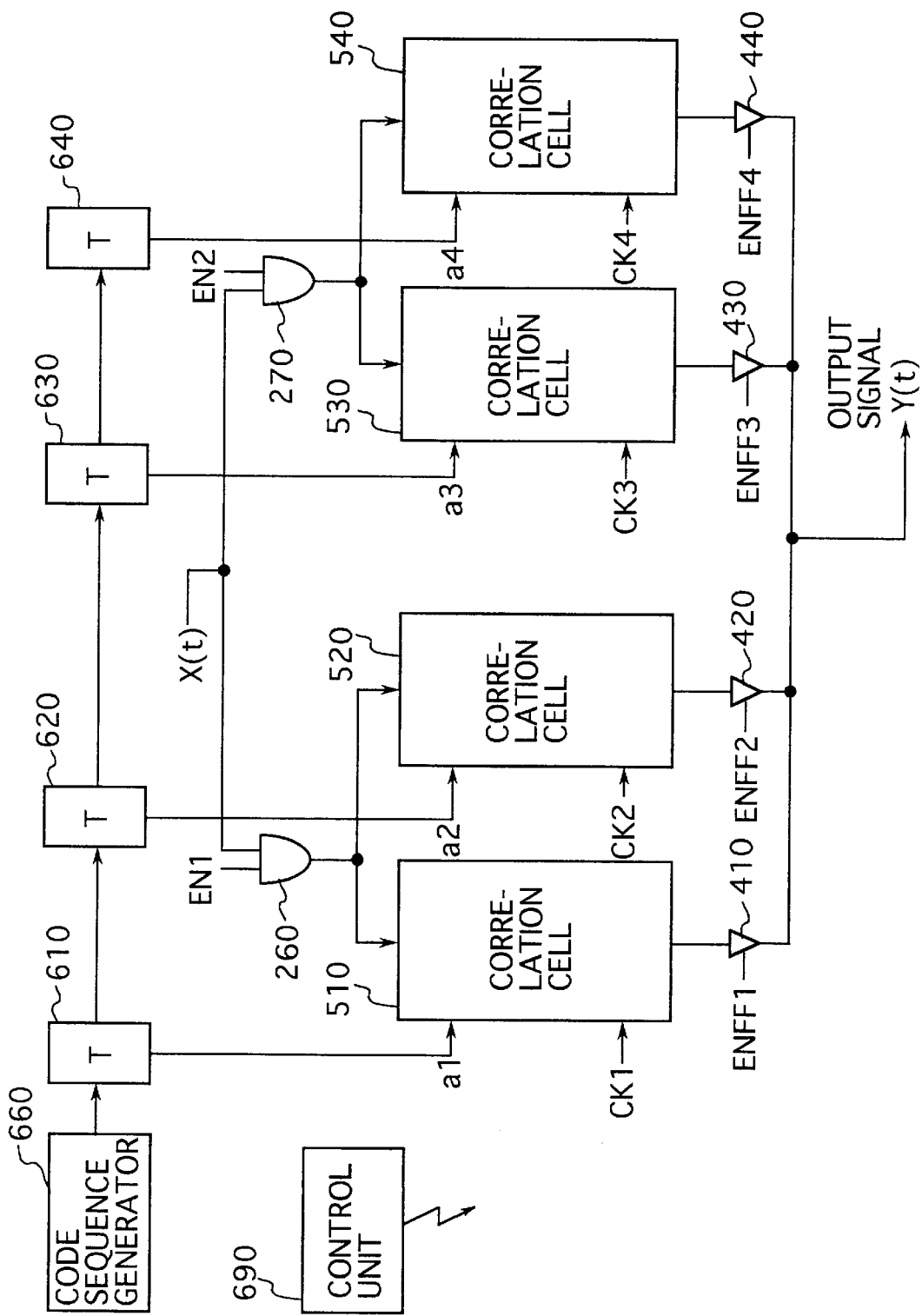
FIG. 7 is a block diagram showing a sixth preferred embodiment of the matched filter according to the present invention.

Referring to FIG. 7 of the drawings, there is shown a sixth preferred embodiment of the matched filter according to the present invention. As shown in FIG. 7, the matched filter partially includes the same means and elements as those of the second through fifth embodiments. The same means and elements as those of the second through fifth embodiments are respectively designated by the same reference numerals 260 through 540 as those of the second through fifth embodiments.

The sixth embodiment of the matched filter comprises first, second, third and fourth hold unit 610, 620, 630 and 640, a code sequence generator 660 and a control unit 690. The control unit 690 is designed to provide the matched filter with a plurality of control signal including the first through fourth control signals CL1, CL2, CL3 and CL4 and the initialization signal INT same as those of the first embodiment, the first and second enable signals EN1 and EN2 same as those of the second embodiment and first, second, third and fourth hold enable signals ENFF1, ENFF2, ENFF3 and ENFF4 same as the those of the fourth embodiment. The control unit 690 is further designed to supply first, second, third and fourth clock signals CK1, CK2, CK3 and CK4 to supply the first, second, third and fourth correlators 110, 120, 130 and 140, respectively.

In this embodiment, the first and third clock signals CK1 and CK3 are simultaneously supplied to a pair of the first and third correlators 110 and 130, so that the pair of the first and third correlators 110 and 130 are simultaneously enabled. Conversely, the first and third clock signals CK1 and CK3 are restricted thereby disabling the pair of the first and third correlators 110 and 130 from operating. The second and fourth clock signals CK2 and CK4 are simultaneously supplied to a pair of the second and fourth correlators 120 and 140, so that the pair of the second and fourth correlators 120 and 140 are simultaneously enabled. Conversely, the second and fourth clock signals CK2 and CK4 are restricted thereby disabling the pair of the second and fourth correlators 130 and 140 from operating.

Figure 8:
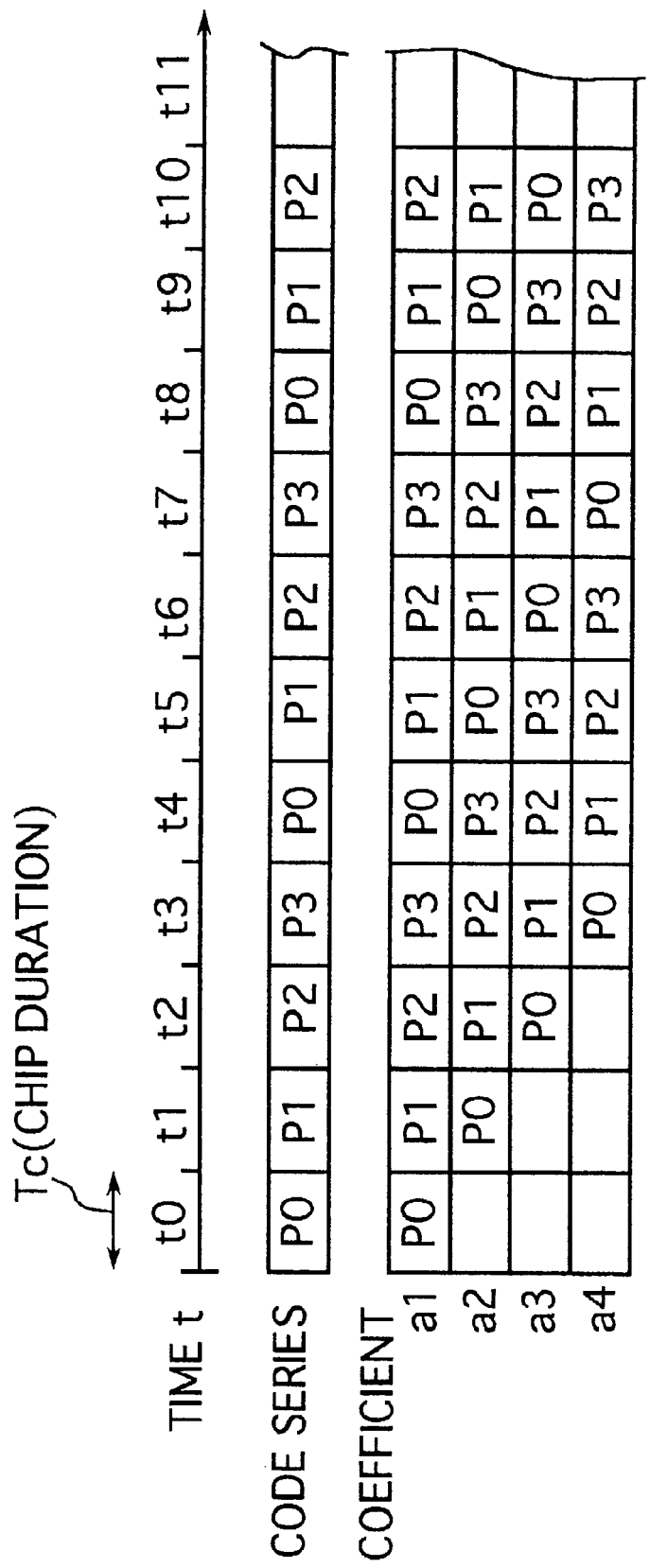
FIG. 8 is a timing chart of the operation of the matched filter shown in FIG. 7.

The code sequence generator 660 is designed to generate a series of codes as shown in FIG. 8. Each of codes P0, P1, P2 and P3 indicates data at each distortion of a phase of a desired reference signal to be correlated with the input signal. The first hold unit 610 has input and output terminals.

The first hold unit 610 is electrically connected to the code sequence generator 660 to sequentially input the generated codes through the input terminal. The first hold unit 610 is designed to hold the inputted code for a predetermined period to output the held data through the output terminal after a lapse of the period and then to reset the held data. In this embodiment, the period is one chip.

The second hold unit 620 has input and output terminals. The second hold unit 620 is electrically connected to the first hold unit 610 to input the code through the input terminal. The second hold unit 620 is designed to hold the inputted code for one chip duration output the held data through the output terminal after a lapse of one chip duration and then to reset the held data.

The third hold unit 630 has input and output terminals. The third hold unit 630 is electrically connected to the second hold unit 620 to input the code through the input terminal. The third hold unit 630 is designed to hold the inputted code for one chip duration to output the held data through the output terminal after a lapse of one chip duration and then to reset the held data.

The fourth hold unit 640 has input and output terminals. The fourth hold unit 640 is electrically connected to the third hold unit 630 to input the code through the input terminal. The fourth hold unit 640 is designed to hold the inputted code for one chip duration to output the held data through the output terminal after a lapse of one chip duration and then to reset the held data.

It is understood from the above description that the first, second, third and fourth hold units 610, 620, 630 and 640 are integrally formed into a four-steps shift-register. Therefore, a series of codes generated by the code sequence generator 660 is shifted to the first, second, third and fourth hold units 610, 620, 630 and 640 in serial at intervals, i.e., chip by chip. The codes thus outputted from the first, second, third and fourth hold units 610, 620, 630 and 640 are supplied to the correlation cells 510, 520, 530 and 540 as the first, second, third and fourth coefficients a1, a2, a3 and a4, respectively. It is appreciated from FIGS. 2 and 7 that the supplied coefficients shown in FIG. 8 are identical to the coefficients shown in FIG. 2. Consequently, each of the codes is generated for once chip by chip, so that the plurality of the correlators can be supplied with the coefficients, respectively.

The sixth embodiment of the matched filter thus constructed can be reduced in size, since the code sequence generating means of the matched filter can be constructed from a shift resister having a plurality of bits in addition to one code sequence generator. Therefore, the present invention can provide the matched filter at a low price, because of the fact that the code generating means can be reduced in size.

There will be explained hereinafter a seventh embodiment of the matched filter according to the present invention in which the sixth embodiment of the matched filter according to the present invention is adapted to the over-sampling of the input signal. In this embodiment, the operation timing of the matched filter may occur at half intervals of the sixth embodiment, i.e., half chip Tc/2.

In this embodiment, the control unit 690 is designed to supply the same signals as the above embodiment, but timing of supplying the signals is different from the above embodiment. The timing of supplying the signal will be explained in detail in the following descriptions.

The manner of the operation of the seventh embodiment of the matched filter in connection with the drawings will be explained hereinafter with reference to FIG. 9.

Figure 9:
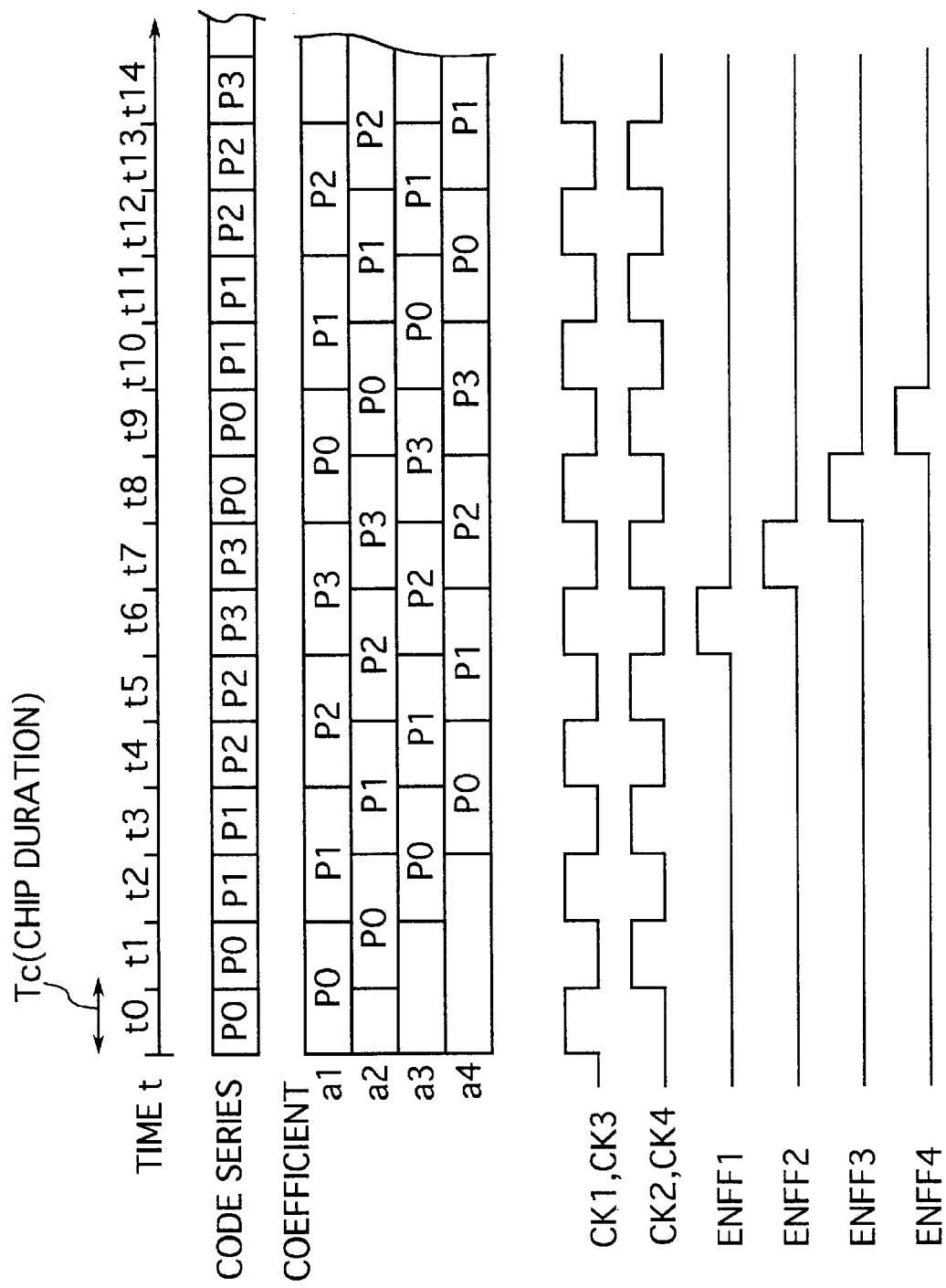
FIG. 9 is a timing chart of the operation of the matched filter shown in FIG. 7.

As shown in FIG. 9, the first, second, third and fourth coefficients a1, a2, a3 and a4 are generated by the code sequence generator 660 chip by chip. The generation cycles of the coefficients are deviated from each other at half chip Tcd 2. In FIG. 9, the first, second, third, fourth, . . . times in the operation timings of the matched filter are represented by the reference characters t0, t2, t3, . . . .

In each of the correlation cells, the product-sum operation is carried out through the steps of: supplying the first, second, third and fourth coefficients a1, a2, a3 and a4 for the first, second, third and fourth correlation cells 510, 520, 530 and 540, respectively, and multiplying the input signal X(t) by the first, second, third and fourth coefficients a1, a2, a3 and a4 by the multipliers of the first, second, third and fourth correlation cells 510, 520, 530 and 540, respectively. The product-sum operation is further comprises the steps of: adding the product to the inputted from the hold unit of the first, second, third and fourth correlation cells 510, 520, 530 and 540 by the adder of the first, second, third and fourth correlation cells 510, 520, 530 and 540, respectively, and holding the sum in the hold units of the first, second, third and fourth correlation cells 510, 520, 530 and 540, respectively.

In this embodiment, the clock signals are supplied from the control unit 690 as illustrated in FIG. 9. The first clock signal CK1 starts to be repeatedly supplied to the first correlation cell 510 from the first time t0 chip by chip. The second clock signal CK2 starts to be repeatedly supplied to the second correlation cell 520 from the second time t1 chip by chip. The third clock signal CK3 starts to be repeatedly supplied to the third correlation cell 530 from the third time t2 chip by chip. The fourth clock signal CK4 starts to be repeatedly supplied to the fourth correlation cell 540 from the third time t3 chip by chip.

At the first time t0, the first code P0 is supplied to the first hold unit 610 by the code sequence generator 660. At the same time, the input signal X(t0) and the first code P0 are fed into the first correlation cell 510. In the first correlation cell 510, the first code P0 is supplied to the first coefficient a1 of the multiplier. Then, the first correlation cell 510 carries out the product-sum operation based on the input signal X(t0) and the first code P0 in response to the first clock signal CK1. Therefore, the first result in the product-sum operation in the first correlation cell 510 is obtained.

At the second time t1, the first code P0 held in the first hold unit 610 is shifted into the second hold unit 620. At the same time, the first code P0 is again supplied to the first hold unit 610 by the code sequence generator 660. Then, the input signal X(t1) and the first code P0 are fed into the first and second correlation cells 510 and 520. At this time, the first clock signal CK1 is restricted and as a result the first correlation cell 510 is disabled. In the second correlation cell 520, the first code P0 is supplied to the second coefficient a2 of the multiplier. Then, the second correlation cell 520 carries out the product-sum operation based on the input signal X(t1) and the first code P0 in response to the second clock signal CK2. Therefore, the first result in the product-sum operation in the second correlation cell 520 is obtained.

At the third time t2, the first code P0 held in the first and second hold units 610 and 620 are shifted into the second and third hold units 620 and 630. At the same time, the second code P1 is supplied to the first hold unit 610 by the code sequence generator 660. Then, the second code P1 and the input signal X(t2) are fed into the first correlation cell 510, while the first code P0 and the input signal X(t2) are fed into the second and third correlation cells 520 and 530. At this time, the second clock signal CK2 is restricted and as a result the second correlation cell 520 is disabled. In the first and third correlation cell 510 and 530, the second and first codes P1 and P0 are supplied to the first and third coefficients a1 and a3 of the multipliers, respectively. Then, the first and third correlation cells 510 and 530 carry out the product-sum. operation based on the input signal X(t2) and the second and first codes P1 and P0 in response to the first and third clock signals CK1 and CK3, respectively. Therefore, the second and first results in the product-sum operation in the first and third correlation cells 510 and 530, respectively, are obtained.

At the fourth time t3, the first code P0 held in the second and third hold units 620 and 630 are shifted into the third and fourth hold units 630 and 640, while the second code P1 held in the first hold units 610 is shifted into the second hold unit 620. At the same time, the second code P1 is again supplied to the first hold unit 610 by the code sequence generator 660. Then, the second code P1 and the input signal X(t3) are fed into the first and second correlation cells 510 and 520, while the first code P0 and the input signal X(t3) are fed into the third and fourth correlation cells 530 and 540. At this time, the first and third clock signals CK1 and CK3 are restricted and as a result the first and third correlation cells 510 and 530 are disabled. In the second and fourth correlation cells 520 and 540, the second and first codes P1 and P0 are supplied to the second and fourth coefficients a2 and a4 of the multipliers, respectively. Then, the second and fourth correlation cells 520 and 540 carry out the product-sum operation based on the input signal X(t3) and the second and first codes P1 and P0 in response to the second and fourth clock signals CK2 and CK4, respectively. Therefore, the second and first results in the product-sum operation in the second and fourth correlation cells 520 and 540, respectively, are obtained.

At the fifth time t4, the first code P0 held in the third hold unit 630 is shifted into the fourth hold unit 640, while the second code P1 held in the first and second hold units 610 and 620 are shifted into the second and third hold units 620 and 630, respectively. At the same time, the third code P2 is supplied to the first hold unit 610 by the code sequence generator 660. Then, the third code P2 and the input signal X(t4) are fed into the first correlation cell 510, while the second code P1 and the input signal X(t4) are fed into the second and third correlation cells 520 and 530. The first code P0 and the input signal X(t4) are also fed into the fourth correlation cell 540. At this time, the second and fourth clock signals CK2 and CK4 are restricted and as a result the second and fourth correlation cells 520 and 540 are disabled. In the first and third correlation cells 510 and 530, the third and second codes P2 and P1 are supplied to the first and third coefficients a1 and a3 of the multipliers, respectively. Then, the first and third correlation cells 510 and 530 carry out the product-sum operation based on the input signal X(t4) and the third and second codes P2 and P1 in response to the first and third clock signals CK1 and CK3, respectively. Therefore, the third and second results in the product-sum operation in the first and third correlation cells 510 and 530, respectively, are obtained.

At the sixth time t5, the second code P1 held in the second and third hold units 620 and 630 are shifted into the third and fourth hold units 630 and 640, respectively, while the third code P2 held in the first hold unit 610 is shifted into the second hold unit 620. At the same time, the third code P2 is again supplied to the first hold unit 610 by the code sequence generator 660. Then, the third code P2 and the input signal X(t5) are fed into the first and second correlation cells 510 and 520, while the second code P1 and the input signal X(t5) are fed into the third and fourth correlation cells 530 and 540. At this time, the first and third clock signals CK1 and CK3 are restricted and as a result the first and third correlation cells 510 and 530 are disabled. In the second and fourth correlation cells 520 and 540, the third and second codes P2 and P1 are supplied to the second and fourth coefficients a2 and a4 of the multipliers, respectively. Then, the second and fourth correlation cells 520 and 540 carry out the product-sum operation based on the input signal X(t5) and the third and second codes P2 and P1 in response to the second and fourth clock signals CK2 and CK4, respectively. Therefore, the third and second results in the product-sum operation in the second and fourth correlation cells 520 and 540, respectively, are obtained.

At the seventh time t6, the second code P1 held in the third hold unit 630 is shifted into the fourth hold unit 640, while the third code P2 held in the first and second hold units 610 and 620 are shifted into the second and third hold units 620 and 630, respectively. At the same time, the fourth code P3 is supplied to the first hold unit 610 by the code sequence generator 660. Then, the fourth code P3 and the input signal X(t6) are fed into the first correlation cell 510, while the third code P2 and the input signal X(t6) are fed into the second and third correlation cells 520 and 530. The second code P1 and the input signal X(t6) are thus obtain into the fourth correlation cell 540.

At this time, the second and fourth clock signals CK2 and CK4 are restricted and as a result the second and fourth correlation cells 520 and 540 are disabled. In the first and third correlation cells 510 and 530, the fourth and third codes P3 and P2 are supplied to the first and third coefficients a1 and a3 of the multipliers, respectively. Then, the first and third correlation cells 510 and 530 carry out the product-sum operation based on the input signal X(t6) and the fourth and third codes P3 and P2 in response to the first and third clock signals CK1 and CK3, respectively. Therefore, the fourth and third results in the product-sum operation in the first and third correlation cells 510 and 530, respectively, are obtained.

The fourth result in the product-sum operation in the first correlation cell 510 is thus obtained indicating the correlation value is outputted in response to the first hold enable signal ENFF1 through the first tri-state buffer 410. Then, the first correlation cell 510 is reset.

At the eighth time t7, the third code P2 held in the second and third hold units 620 and 630 are shifted into the third and fourth hold units 630 and 640, respectively, while the fourth code P3 held in the first hold unit 610 is shifted into the second hold unit 620. At the same time, the fourth code P3 is again supplied to the first hold unit 610 by the code sequence generator 660. Then, the fourth code P3 and the input signal X(t7) are fed into the first and second correlation cells 510 and 520, while the third code P2 and the input signal X(t7) are fed into the third and fourth correlation cells 530 and 540.

At this time, the first and third clock signals CK1 and CK3 are restricted and as a result the first and third correlation cells 510 and 530 are disabled. In the second and fourth correlation cells 520 and 540, the fourth and third codes P3 and P2 are supplied to the second and fourth coefficients a2 and a4 of the multipliers, respectively. Then, the second and fourth correlation cells 520 and 540 carry out the product-sum operation based on the input signal X(t7) and the fourth and third codes P3 and P2 in response to the second and fourth clock signals CK2 and CK4, respectively. Therefore, the fourth and third results in the product-sum operation in the second and fourth correlation cells 520 and 540, respectively, are obtained.

The fourth result in the product-sum operation in the second correlation cell 520 is thus obtained indicating the correlation value is outputted in response to the second hold enable signal ENFF2 through the second tri-state buffer 420. Then, the second correlation cell 520 is reset.

At the ninth time t8, the third code P2 held in the third hold unit 630 is shifted into the fourth hold unit 640, while the fourth code P3 held in the first and second hold units 610 and 620 are shifted into the second and third hold units 620 and 630, respectively. At the same time, the first code P0 is supplied to the first hold unit 610 by the code sequence generator 660. Then, the first code P0 and the input signal X(t8) are fed into the first correlation cell 510, while the fourth code P3 and the input signal X(t8) are fed into the second and third correlation cells 520 and 530. The third code P2 and the input signal X(t8) are also fed into the fourth correlation cell 540.

At this time, the second and fourth clock signals CK2 and CK4 are restricted and as a result the second and fourth correlation cells 520 and 540 are disabled. In the first and third correlation cells 510 and 530, the first and fourth codes P0 and P3 are supplied to the first and third coefficients a1 and a3 of the multipliers, respectively. Then, the first and third correlation cells 510 and 530 carry out the product-sum operation based on the input signal X(t8) and the first and fourth codes P0 and P3 in response to the first and third clock signals CK1 and CK3, respectively. Therefore, the first and fourth results in the product-sum operation in the first and third correlation cells 510 and 530, respectively, are obtained.

The fourth result in the product-sum operation in the third correlation cell 530 is thus obtained indicating the correlation value is outputted in response to the third hold enable signal ENFF3 through the third tri-state buffer 430. Then, the third correlation cell 530 is reset.

At the tenth time t9, the fourth code P3 held in the second and third hold units 620 and 630 are shifted into the third and fourth hold units 630 and 640, respectively, while the first code P0 held in the first hold unit 610 is shifted into the second hold unit 620. At the same time, the first code P0 is again supplied to the first hold unit 610 by the code sequence generator 660. Then, the first code P0 and the input signal X(t9) are fed into the first and second correlation cells 510 and 520, while the fourth code P3 and the input signal X(t9) are fed into the third and fourth correlation cells 530 and 540.

At this time, the first and third clock signals CK1 and CK3 are restricted and as a result the first and third correlation cells 510 and 530 are disabled. In the second and fourth correlation cells 520 and 540, the first and fourth codes P0 and P3 are supplied to the second and fourth coefficients a2 and a4 of the multipliers, respectively. Then, the second and fourth correlation cells 520 and 540 carry out the product-sum operation based on the input signal X(t9) and the first and fourth codes P0 and P3 in response to the second and fourth clock signals CK2 and CK4, respectively. Therefore, the first and fourth results in the product-sum operation in the second and fourth correlation cells 520 and 540, respectively, are obtained.

The fourth result in the product-sum operation in the fourth correlation cell 540 is thus obtained indicating the correlation value is outputted in response to the fourth hold enable signal ENFF4 through the fourth tri-state buffer 440. Then, the fourth correlation cell 540 is reset.

At the following times t10, t11, . . . , the aforementioned operations in the operation cycle between the first through tenth times t0 to t9 are repeated to perform the over-sampling in the former half of the four chips.

Alternatively, the input signal corresponding to the latter half of the four chips may be over-sampled. The operation timings of the matched filter can be controlled in response to the variable signals generated by the control unit 690.

Alternatively, the matched filter according to the present invention may be sampled at 1/n times chip rate, i.e., adapted to n times over-sampling the input signal.

Furthermore, the matched filter in the CDMA system may be adaptable for the spreading ratio of m chips to one sequence period T by setting the repeat counts in the product-sum operations to m.

The seventh embodiment of the matched filter thus constructed has flexibility in design, i.e., being adaptable for the over-sampling operation in which the chip rate is variable and can be used for any input wave signal having various spreading ratio.

Figure 10:
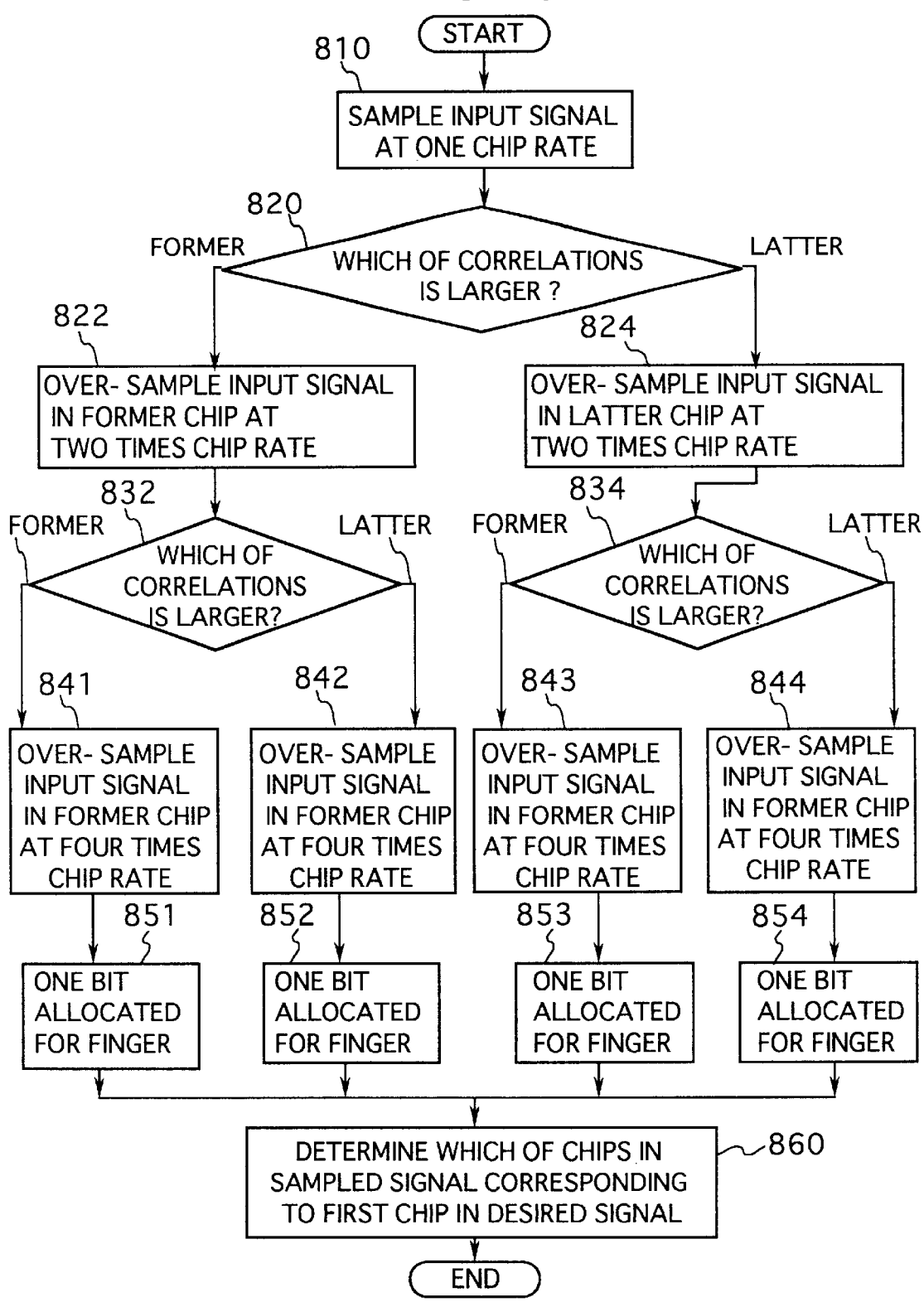
FIG. 10 is a flowchart of the processes in the method of synchronizing the input wave signal with the desired wave signal according to the present invention.
Figure 11:
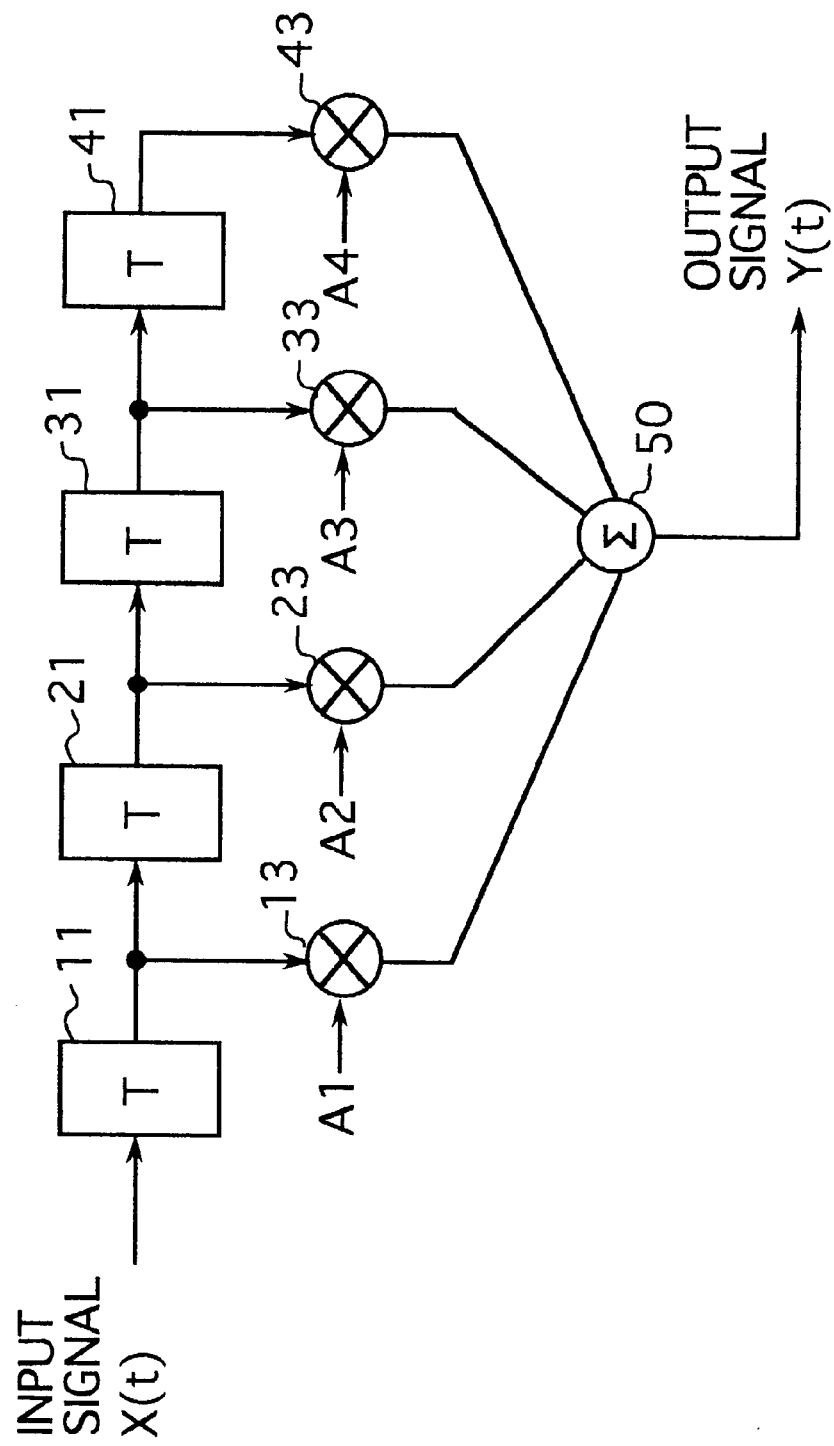
FIG. 11 is a block diagram showing the conventional matched filter.

Referring to FIG. 10 of the drawings, there is shown an eighth preferred embodiment of the matched filter according to the present invention. In this embodiment, it will be explained hereinafter a method of synchronizing a phase of an input wave signal with that of a desired wave signal at an initial time by the use of the matched filter described in the seventh embodiment. The matched filter is adaptable for a rake receiver for receiving an input wave signal which is scattered. The scattered signals are gathered by the rake receiver having a plurality of fingers through which the scattered input signal is received.

In the step 810 shown in FIG. 10, the matched filter is operated to sample the input signal at a chip rate of one sampling time to one chip duration Tc without over-sampling, so that four correlation values are obtained by the first, second, third and is fourth correlation cells 510, 520, 530 and 540.

Herein after a pair of the first and second correlation cells 510 and 520 are referred to as a former group of correlation cells, while a pair of the third and fourth correlation cells 530 and 540 are referred to as a latter group of correlation cells. In the following step 820, the judgement is made upon which of the correlation values is the larger between the two groups. In the case where the correlation values of the former group are larger than those of the latter group, the step 820 leads to the step 822. In the case where the correlation values of the latter group are larger than those of the former group, the step 820 leads to the step 824.

In the step 822, the matched filter is operated to over-sample the input signal in the former two chips at the chip rate of two sampling times to one chip duration Tc, so that the four correlation values in the former two chips are obtained by the first, second, third and fourth correlation cells 510, 520, 530 and 540.

In the step 824, the matched filter is operated to over-sample the input signal in the latter two chips at the chip rate of two sampling times to one chip duration Tc, so that the four correlation values in the latter two chips are obtained by the first, second, third and fourth correlation cells 510, 520, 530 and 540.

The step 822 leads to the step 832 in which the judgement is made upon which of the correlation values is the larger between the two groups. In the case where the correlation values of the former group are larger than those of the latter group, the step 832 leads to the step 841. In the case where the correlation values of the latter group are larger than those of the former group, the step 832 leads to the step 842.

The step 824 leads to the step 834 in which the judgement is made upon which of the correlation values is the larger between the two groups. In the case where the correlation values of the former group are larger than those of the latter group, the step 834 leads to the step 843. In the case where the correlation values of the latter group are larger than those of the former group, the step 834 leads to the step 844.

In the step 841, the matched filter is operated to over-sample the input signal in the first chip at the chip rate of four sampling times to one chip duration Tc, so that the four correlation values in the first chip are sequentially obtained by the first, second, third and fourth correlation cells 510, 520, 530 and 540 every 1/4 chip duration.

In the step 842, the matched filter is operated to over-sample the input signal in the second chip at the chip rate of four sampling times to one chip duration Tc, so that the four correlation values in the second chip are sequentially obtained by the first, second, third and fourth correlation cells 510, 520, 530 and 540 every 1/4 chip duration.

In the step 843, the matched filter is operated to over-sample the input signal in the third chip at the chip rate of four sampling times to one chip duration Tc, so that the four correlation values in the third chip are sequentially obtained by the first, second, third and fourth correlation cells 510, 520, 530 and 540 every 1/4 chip duration.

In the step 844, the matched filter is operated to over-sample the input signal in the fourth chip at the chip rate of two sampling times to one chip duration Tc, so that the four correlation values in the fourth chip are sequentially obtained by the first, second, third and fourth correlation cells 510, 520, 530 and 540 every 1/4 chip duration.

The steps 841 to 844 lead to the steps 851 to 854, respectively. In the steps 851 to 854, the judgement is made upon which of bits in one chip is allocated for the finger in a rake receiver. The steps 851 to 854 lead to the step 860 in which the judgement is made upon which of chips is over-sampled in the steps 841 to 844. The operation timing of the matched filter is determined according to the result made by the judgement. In the case where the step 860 is followed by the step 851, the judgement is made that the first chip in the sampled signal corresponds to the first chip in the desired reference signal. In the case where the step 860 is followed by the step 852, the judgement is made that the second chip in the sampled signal corresponds to the first chip in the desired reference signal. In the case where the step 860 is followed by the step 853, the judgement is made that the third chip in the sampled signal corresponds to the first chip in the desired reference signal. In the case where the step 860 is followed by the step 854, the judgement is made that the fourth chip in the sampled signal corresponds to the first chip in the desired reference signal.

It will be appreciated from the above description that the matched filter according to the present invention has an advantage over the prior art in over-sampling the input signal because of the fact that the matched filer can perform the over-sampling for the input signal at chip rate of n sampling times to one chip duration Tc. The present invention can provide a matched filter which is effective in rapidly synchronization, thereby making it possible to improve the performance of receiving the wave signal in the receiver.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. A matched filter comprising:
(A) a plurality of correlation units each correlation unit comprising:
   (1) a multiplier for multiplying an input signal by a predetermined coefficient at predetermined intervals in a predetermined operation cycle of said matched filter to obtain a product, said coefficient sequentially varying at said intervals, and
   (2) an integrator for integrating the product obtained by said multiplier over said operation cycle into a correlation value;
(B) control means for outputting a plurality of control signals at said intervals to direct said correlation units, respectively, to start operating; and
(C) a multiplexer electrically connected to said correlation units for inputting the correlation values from said correlation units and sequentially outputting one of the inputted correlation values in response to said control signal and resetting said outputted one of said inputted correlation values,
   wherein said integrator of each of said correlation units comprises: an adder having a first input terminal, a second input terminal and an output terminal for adding first data inputted through said first input terminal with second data inputted through said second input terminal to obtain a sum of said first and said second data and for outputting said sum through said output terminal at said intervals; and hold means having an input terminal electrically connected to said output terminal of said adder and an output terminal electrically connected to said second input terminal of said adder and said multiplexer, for inputting said sum from said adder and outputting said sum to said adder at said intervals, and holding said sum as a preserved data until said preserved data is outputted to said multiplexer and reset in response to said control signal.

2. A matched filter as set forth in claim 1, in which the number of intervals represents a spreading ratio in said input signal.

3. A matched filter as set forth in claim 1, in which said coefficient is varied in response to a predetermined code sequence for said input signal at said intervals.

4. A matched filter comprising:
(A) a plurality of correlation units each correlation unit comprising:
   (1) a multiplier for multiplying an input signal by a predetermined coefficient at predetermined intervals in a predetermined operation cycle of said matched filter to obtain a product, said coefficient sequentially varying at said intervals, and
   (2) an integrator for integrating the product obtained by said multiplier over said operation cycle into a correlation value;
(B) control means for outputting a plurality of control signals at said intervals to direct said correlation units, respectively, to start operating; and
(C) a multiplexer electrically connected to said correlation units for inputting the correlation values from said correlation units and sequentially outputting one of the inputted correlation values in response to said control signal and resetting said outputted one of said inputted correlation values,; and
(D) signal supply means electrically connected to said correlation units for selectively supplying said input signal for at least one of said correlation units.

5. A matched filter comprising:
(A) a plurality of correlation units each correlation unit comprising:
   (1) a multiplier for multiplying an input signal by a predetermined coefficient at predetermined intervals in a predetermined operation cycle of said matched filter to obtain a product, said coefficient sequentially varying at said intervals, and
   (2) an integrator for integrating the product obtained by said multiplier over said operation cycle into a correlation value;
(B) control means for outputting a plurality of control signals at said intervals to direct said correlation units, respectively, to start operating; and
(C) a multiplexer electrically connected to said correlation units for inputting the correlation values from said correlation units and sequentially outputting one of the inputted correlation values in response to said control signal and resetting said outputted one of said inputted correlation values, and
(D) enable means for selectively enabling at least one of said correlation units.

6. A matched filter as set forth in claim 1, in which said multiplexer is constructed by a tri-state buffer.

7. A matched filter comprising:
(A) a plurality of correlation units each correlation unit comprising:
   (1) a multiplier for multiplying an input signal by a predetermined coefficient at predetermined intervals in a predetermined operation cycle of said matched filter to obtain a product, said coefficient sequentially varying at said intervals, and
   (2) an integrator for integrating the product obtained by said multiplier over said operation cycle into a correlation value;
(B) control means for outputting a plurality of control signals at said intervals to direct said correlation units, respectively, to start operating; and (C) a multiplexer electrically connected to said correlation units for inputting the correlation values from said correlation units and sequentially outputting one of the inputted correlation values in response to said control signal and resetting said outputted one of said inputted correlation values, wherein each correlation unit is constructed from the cell designed by the standard cell method.

8. A matched filter comprising:
(A) a plurality of correlation units each correlation unit comprising:
 (1) a multiplier for multiplying an input signal by a predetermined coefficient at predetermined intervals in a predetermined operation cycle of said matched filter to obtain a product, said coefficient sequentially varying at said intervals, and
 (2) an integrator for integrating the product obtained by said multiplier over said operation cycle into a correlation value;
(B) control means for outputting a plurality of control signals at said intervals to direct said correlation units, respectively, to start operating; and
(C) a multiplexer electrically connected to said correlation units for inputting the correlation values from said correlation units and sequentially outputting one of the inputted correlation values in response to said control signal and resetting said outputted one of said inputted correlation values, and
(D) a coefficient generator for generating a series of coefficients, having a hold unit to sequentially input and hold each of said coefficients therein and shift in turn said coefficients one after another.

9. A matched filter as set forth in claim 1, being utilized for a receiver in a code division multiple access system.

10. A matched filter as set forth in claim 1, being adapted to the over-sampling of said input signal at a chip rate of n sampling times to one chip duration.

11. A method of synchronizing a phase of an input wave signal with that of a desired wave signal, comprising the steps of:
 (a) calculating a correlation value between said input wave signal and a predetermined coefficient;
 (b) changing said coefficient to another coefficient;
 (c) repeating said steps (a) and (b) at predetermined intervals in a predetermined operation cycle;
 (d) outputting said correlation value obtained in said step (c) after a lapse of said operation cycle; and repeating said steps (a) to (d),
 wherein said step (a) further comprises the steps of:
 (a1) holding a predetermined data
 (a2) multiplying said input signal by said coefficient;
 (a3) adding data obtained by the multiplication with the held data; and
 (a4) holding said sum obtained by said addition; and repeating said steps (a2) to (a4) over said operation cycle.

12. A method as set forth in claim 11, in which the number of intervals represents a spreading ratio in said input signal.

13. A method as set forth in claim 11, in which said step (b) has the step of varying said coefficient in response to a predetermined code sequence for said input signal at said intervals.

14. A method as set forth in claim 11, being utilized for a receiver in a code division multiple access system.

15. A method as set forth in claim 11, further comprising the steps of:
 sampling said input signal at a chip rate of n sampling times to one chip duration, so as to replace said sampled signal with said input signal in said step (a);
 synchronizing the phase of the input wave signal with that of the desired wave signal on the basis of the correlation values obtained by said step (d).

16. A matched filter as set forth in claim 4, in which the number of intervals represents a spreading ratio in said input signal.

17. A matched filter as set forth in claim 4, in which said coefficient is varied in response to a predetermined code sequence for said input signal at said intervals.

18. A matched filter as set forth in claim 4, in which said multiplexer is constructed by a tri-state buffer.

19. A matched filter as set forth in claim 4, being utilized for a receiver in a code division multiple access systems.

20. A matched filter as set forth in claim 4, adapted to over-sample said input signal at a chip rate of n sampling times to one chip duration.

21. A matched filter as set forth in claim 5, in which the number of intervals represents a spreading ratio in said input signal.

22. A matched filter as set forth in claim 5, in which said coefficient is varied in response to a predetermined code sequence for said input signal at said intervals.

23. A matched filter as set forth in claim 5, in which said multiplexer is constructed by a tri-state buffer.

24. A matched filter as set forth in claim 5, being utilized for a receiver in a code division multiple access system.

25. A matched filter as set forth in claim 5, adapted to over-sample said input signal at a chip rate of n sampling times to one chip duration.

26. A matched filter as set forth in claim 7, in which the number of intervals represents a spreading ratio in said input signal.

27. A matched filter as set forth in claim 7, in which said coefficient is varied in response to a predetermined code sequence for said input signal at said intervals.

28. A matched filter as set forth in claim 7, in which said multiplexer is constructed by a tri-state buffer.

29. A matched filter as set forth in claim 7, being utilized for a receiver in a code division multiple access system.

30. A matched filter as set forth in claim 7, adapted to over-sample said input signal at a chip rate of n sampling times to one chip duration.

31. A matched filter as set forth in claim 8, in which the number of intervals represents a spreading ratio in said input signal.

32. A matched filter as set forth in claim 8, in which said coefficient is varied in response to a predetermined code sequence for said input signal at said intervals.

33. A matched filter as set forth in claim 8, in which said multiplexer is constructed by a tri-state buffer.

34. A matched filter as set forth in claim 8, being utilized for a receiver in a code division multiple access system.

35. A matched filter as set forth in claim 8, adapted to over-sample said input signal at a chip rate of n sampling times to one chip duration.

* * * * *